(12) United States Patent
Jannink et al.

(10) Patent No.: US 10,146,869 B2
(45) Date of Patent: Dec. 4, 2018

(54) SYSTEMS AND METHODS FOR ORGANIZING AND ANALYZING AUDIO CONTENT DERIVED FROM MEDIA FILES

(71) Applicant: VoiceBase, Inc., Palo Alto, CA (US)

(72) Inventors: Jan Jannink, Menlo Park, CA (US); Walter Bachtiger, Novato, CA (US)

( * ) Notice: Subject to any disclaimer, the term of this patent is extended or adjusted under 35 U.S.C. 154(b) by 0 days.

(21) Appl. No.: 15/979,346

(22) Filed: May 14, 2018

(65) Prior Publication Data

US 2018/0260480 A1 Sep. 13, 2018

Related U.S. Application Data

(63) Continuation of application No. 14/793,660, filed on Jul. 7, 2015, now Pat. No. 10,002,192, which is a continuation-in-part of application No. 13/751,115, filed on Jan. 27, 2013, now Pat. No. 9,142,216, and a continuation-in-part of application No. 13/751,108, filed on Jan. 27, 2013, now abandoned, and a continuation-in-part of application No. 13/751,112, filed on Jan. 27, 2013, now abandoned, and a continuation-in-part of application No. 13/735,186, filed on Jan. 7, 2013, now abandoned, and a continuation-in-part of application No. 13/751,107, filed on Jan. 27, 2013, now abandoned, which is a continuation-in-part of application No. 13/271,195, filed on Oct. 11, 2011, now abandoned, which is a continuation-in-part of application No. 12/878,014, filed on Sep. 8, 2010.

(Continued)

(51) Int. Cl.
G10L 15/00 (2013.01)
G06F 17/30 (2006.01)
G10L 15/26 (2006.01)

(52) U.S. Cl.
CPC .... G06F 17/30778 (2013.01); G06F 17/3074 (2013.01); G10L 15/26 (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 6,404,856 B1 * | 6/2002 | Wilcox | G11B 27/105 379/67.1 |
| 6,507,643 B1 * | 1/2003 | Groner | H04L 51/066 379/88.14 |

(Continued)

*Primary Examiner* — Jesse S Pullias

(57) ABSTRACT

Systems for receiving, analyzing, and organizing audio content contained within a plurality of media files are disclosed. The systems generally include a server that is configured to receive, index, and store a plurality of media files, which are received by the server from a plurality of sources, within at least one database in communication with the server. In addition, the server is configured to make one or more of the media files accessible to and searchable by, one or more persons other than the original sources of such media files. Still further, the server may be configured to organize audio content included within each of the plurality of media files into bipartite graphs; segment media files into parts that exhibit similar attributes; extract and present meta data to a user that pertain to each media file; and employ multi-variable ranking methods to prioritize media file search results.

5 Claims, 22 Drawing Sheets

Related U.S. Application Data

(60) Provisional application No. 61/244,096, filed on Sep. 21, 2009, provisional application No. 61/592,171, filed on Jan. 30, 2012.

(56) References Cited

U.S. PATENT DOCUMENTS

| | | | |
|---|---|---|---|
| 6,603,921 B1 * | 8/2003 | Kanevsky | G11B 27/002 386/253 |
| 6,697,796 B2 * | 2/2004 | Kermani | G06F 17/30017 379/88.14 |
| 2006/0212897 A1 * | 9/2006 | Li | H04H 60/58 725/32 |
| 2009/0154665 A1 * | 6/2009 | Galvin | G06F 21/64 379/88.17 |
| 2010/0070263 A1 * | 3/2010 | Goto | G06F 17/30746 704/8 |

* cited by examiner

SYSTEMS AND METHODS FOR ORGANIZING AND ANALYZING AUDIO CONTENT DERIVED FROM MEDIA FILES

CROSS-REFERENCE TO RELATED APPLICATIONS

This application is a continuation of application Ser. No. 14/793,660 (filed Jul. 7, 2015), which is a continuation-in-part of application Ser. No. 13/751,115 (filed Jan. 27, 2013), which is now U.S. Pat. No. 9,142,216, which claims priority to provisional application 61/592,171 (filed Jan. 30, 2012). In addition, application Ser. No. 14/793,660 (filed Jul. 7, 2015) is a continuation-in-part of application Ser. No. 13/751,108 (filed Jan. 27, 2013), Ser. No. 13/751,112 (filed Jan. 27, 2013), Ser. No. 13/735,186 (filed Jan. 7, 2013), and Ser. No. 13/751,107 (filed Jan. 27, 2013), which is a continuation-in-part of application Ser. No. 13/271,195 (filed Oct. 11, 2011), which is a continuation-in-part of application Ser. No. 12/878,014 (filed Sep. 8, 2010), which claims priority to provisional application 61/244,096 (filed Sep. 21, 2009).

FIELD OF THE INVENTION

The field of the present invention relates to systems and methods for recording, indexing, searching, and analyzing various types of media files and the audio tracks included therein and, more particularly, to systems and methods for organizing and analyzing the content of such audio tracks, as well as extracting relevant key words from a plurality of media files using specific content organization and analysis techniques.

BACKGROUND OF THE INVENTION

Systems for recording and storing media files have been available for many years and, indeed, are used by many individuals and businesses today. In addition, currently-available systems allow users to retrieve, either using a telephone or internet connection, media files that may be stored in a database and correlated with a specific user of the system. Although these systems have become a ubiquitous part of communication (and communication management) in today's world, these systems do not efficiently organize and analyze the content of such media files, particularly in a way that identifies commonalities among a plurality of media files.

For example, currently-available systems do not efficiently analyze a plurality of media files in a manner that allows users to identify key words (or phrases) that are shared across a multitude of media files (or shared across content that is contributed by a particular individual within multiple media files). Still further, currently-available systems do not provide an efficient means for labeling a plurality of media files with various relevant attributes, such as the source of such files, key word usage and frequency, the context in which certain media files are generated, the connectivity and inter-relationships among a multitude of media files, and various other attributes.

As described further below, the present invention addresses many of these, and other, drawbacks that are associated with currently-available media storage and retrieval systems.

SUMMARY OF THE INVENTION

Systems for receiving, analyzing, and organizing audio content contained within a plurality of media files are disclosed. The systems generally include a server that is configured to receive, index, and store a plurality of media files, which are received by the server from a plurality of sources, within at least one database in communication with the server. In addition, the server is configured to make one or more of the media files accessible to and searchable by, one or more persons other than the original sources of such media files. Still further, in certain embodiments, the server is configured to organize audio content included within each of the plurality of media files into a bipartite graph. The bipartite graph will include vertices, with each vertex being correlated with a specific media file or an individual who is associated with a specific media file. These vertices will comprise edges that are labeled with a word that is detected from within the audio content of a media file. Such audio content organization and analytical methods provide new and powerful ways to, among other things, execute unique key word extraction algorithms, to identify and even suggest to a user of the system which key word(s) may be relevant to the user.

According to such aspects of the invention, the edges of the vertices in the bipartite graph may be assigned a secondary label. Examples of these secondary labels may include: (1) a speaker label that indicates that a specific individual is speaking within the corresponding audio content; (2) a share label that indicates that an individual received access to the corresponding audio content from a third party (i.e., the third party referred the media file/audio content to such individual); (3) a podcast label that indicates that an RSS source is correlated to the corresponding audio content; (4) a comment label that indicates that certain commentary, authored by users of the system, has been associated with the corresponding audio content; (5) a frequency label that indicates a number of times that defined portions of the corresponding audio content have been accessed by users of the system; and (6) combinations of the foregoing labels.

The invention provides that one of three operations may be applied to several sets of edges (and the key words they represent) extracted from the bipartite graph. For example, as described further below, a union operation may be employed, which calculates a sum of frequency values for each of a plurality of words found within the audio content of a plurality of media files (with a frequency value representing a number of times that a word is detected within the audio content of a media file). In addition, as described further below, an intersection operation may be utilized, which calculates a sum of frequency values for only those words that are shared among a plurality of media files. Still further, the invention provides that a filter operation can be used, which calculates a sum of frequency values for only those words that are detected within media files that share a secondary label (mentioned above).

The invention provides that additional data organization methods—other than those involving a bipartite graph—may be utilized. However, the invention provides that the audio content organization and analysis methodology described herein enables the application of unique key word extraction algorithms, to identify and even suggest to a user of the system which key word(s) may be relevant to the user. For example, the system may be configured to extract podcast key words from a plurality of media files, which are identified by performing a union operation on a set of media files which exhibit a common podcast label. The system may be configured to extract heat map key words from a plurality of media files, which are identified by performing an intersection operation on a set of key words found within a plurality of media files which exhibit a frequency label that exceeds a minimum threshold. In addition, the system may be configured to extract unheard key words from a plurality of media files, which are identified by performing a union operation that identifies a set of key words that are present across a plurality of media files, which have not yet been heard by users of the system. Still further, the system may be configured to extract comment key words from a plurality of media files, which are identified within segments of audio recordings that are associated with third party comments. The system may further be configured to extract personal or account key words from a plurality of media files, by identifying all key words having a frequency label that exceeds a minimum threshold, which are assigned to the edges of vertices and are correlated to a single person or account. These are a few non-limiting examples of the unique types of key word extraction algorithms that may be applied to the audio content included within a plurality of media files, when such media files are organized and analyzed in the manner described herein.

According to further aspects of the invention, the system is configured to harvest and display certain metadata to a user of the system, such as the date on which each media file was created; a popularity index that is assigned to each media file; one or more theme categories that are assigned to each media file; or combinations of the above. For example, the invention provides that the popularity index may be based upon (i) a number of times that each media file has been played by users of the system; (ii) a number of times that each media file has been shared with or referred to others through the website; (iii) a total number of comments associated with each media file (which are viewable within the website as described herein); or (iv) combinations of such factors. The invention further provides that the one or more theme categories that are assigned to each media file will be based upon the presence and frequency of various terms within the audio content of each media file, with each of such various terms being correlated and catalogued within one or more theme categories.

The invention provides that the acquisition and publication of the types of metadata will render the media file storage and retrieval system described herein more useful, powerful, and intuitive. Such metadata will also efficiently convey the relevancy of media files to a user's interests, as well as the associations and connections that a particular media file may have to individual persons, geographic locations, and other relevant information.

According to yet further aspects of the present invention, improved systems and methods for searching, identifying, and ranking a select number of media files from within a larger body of media files are provided. According to certain embodiments, the systems and methods employ the use of a particular algorithm, which is used to identify and rank a select number of media files (or portions thereof) from a larger body of media files. A non-limiting example of such algorithm is provided below:

$$r_i = a_u(x) + b_v(y) + c_x(z) + d_y(w)$$

In the example above, "$r_i$" represents a weighted ranking value for media file "i," with (x), (y), (z) and (w) corresponding to the criteria described below, and $a_u$, $b_v$, $c_x$, and $d_y$ representing constant weights to adjust the score for each measure. In this example, (x) represents a measurement of key word frequency, key word density, linkage of a media file to other media files, or combinations thereof; (y) represents a measurement of speaker vocal emotion, length of listener playback, speaker charisma parameters, or combinations thereof; (z) represents a measurement of a relative proportion of multiple key words in a media file (i.e., a weighted term ranking), the presence of key words near the beginning and/or end of a media file (i.e., attention ranking), or combinations thereof; and (w) represents a measurement of the social activity that a particular media file has associated with it, such as a number of times that a media file has been shared with or referred to others (as described herein), the number and/or length of comments associated with a particular media file, a number of instances that a media file has been designated as a "favorite" by users of the system, the number of plays or views associated with a media file, or combinations of the foregoing.

According to the foregoing embodiment of the present invention, the larger the "$r_i$" value that is assigned to a particular media file (or portion thereof), the higher it will appear in a set of search results (i.e., the higher the ranking). As described further below, the media file ranking systems and methods of the present invention are preferably used in connection with, and incorporated into, the system that is described herein—which is configured to receive, index, store, and analyze a plurality of media files, such that the plurality of media files may then be queried and ranked using the methods and systems described herein, which will preferably utilize the algorithm set forth above and described in further detail below.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Description of the Media File Storage and Retrieval Systems

Figure 1:
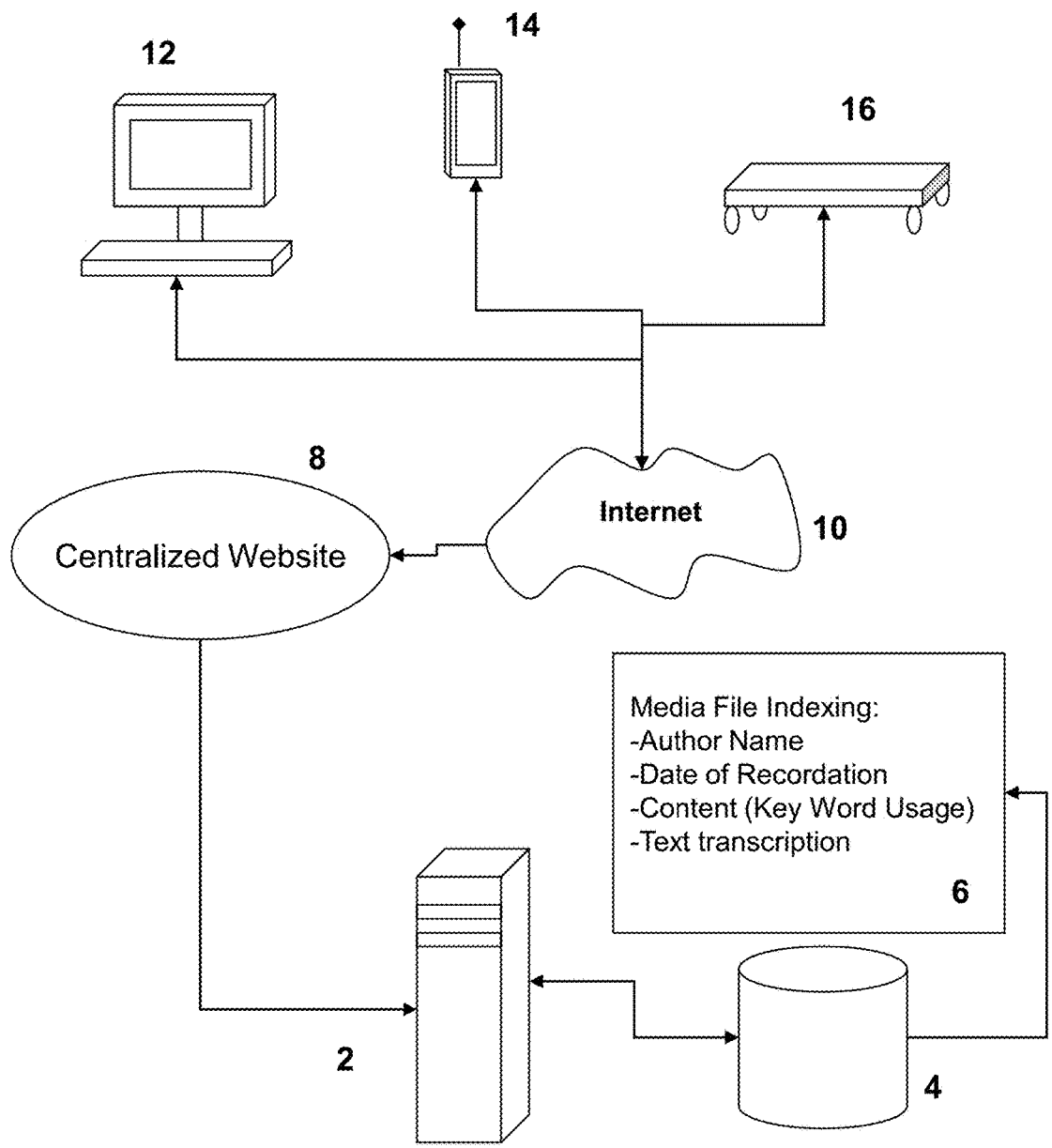
FIG. 1 is a diagram showing the different components of the systems described herein.

According to certain preferred embodiments, the present invention generally utilizes systems for recording, indexing, transcribing, and sharing media files among a plurality of users. As used herein, the term "media file(s)" refers to audio files, video files, voice recordings, streamed media content, and combinations of the foregoing. Referring to FIG. 1, the systems generally comprise a server 2 that is configured to receive, index, and store a plurality of media files, which are received by the server 2 from a plurality of sources, within at least one database 4 in communication with the server 2. The invention provides that the database 4 may reside within the server 2 or, alternatively, may exist outside of the server 4 while being in communication therewith via a network connection.

When the present specification refers to the server 2, the invention provides that the server 2 may comprise a single server or a group of servers. In addition, the invention provides that the system may employ the use of cloud computing, whereby the server paradigm that is utilized to support the system of the present invention is scalable and may involve the use of different servers (and a variable number of servers) at any given time, depending on the number of individuals who are utilizing the system at different time points, which are in fluid communication with the database 4 described herein.

The media files may be indexed 6 and categorized within the database 4 based on author, time of recordation, geographical location of origin, IP addresses, language, key word usage, combinations of the foregoing, and other factors. The invention provides that the media files are preferably submitted to the server 2 through a centralized website 8 that may be accessed through a standard internet connection 10. The invention provides that the website 8 may be accessed, and the media files submitted to the server 2, using any device that is capable of establishing an internet connection 10, such as using a personal computer 12 (including tablet computers), telephone 14 (including smart phones, PDAs, and other similar devices), meeting conference speaker phones 16, and other devices. The invention provides that the media files may be created by such devices and then uploaded to the server 2 or, alternatively, the media files may be streamed in real time (through such devices) with the media files being created (and then indexed and stored)

within the server 2 and database 4. In addition, as explained above, the invention provides that the media files that are stored within the server 2 and database 4 may be derived from audio-only content (e.g., a telephone conversation or talk radio) or, in certain cases, may comprise audio tracks derived from a video file (which has an audio component embedded therein).

The invention provides that the server 2 may receive and manage media files in many ways, such that the contents thereof may be deciphered and used as described herein. For example, the invention provides that upon a media file being submitted to the server 2, the server 2 will perform a speech-to-text, speech-to-phoneme, speech-to-syllable, and/or speech-to-subword conversion, and then store an output of such conversion within the database 4. This way, the content of each media file may be intelligently queried and used in the manner described herein, such as for querying such content for key words.

The invention provides that when reference is made to "media files that contain a key word," and similar phrases, it should be understood that such phrase encompasses a text file that contains the key word, with the text file being derived from a media file, as explained above. In other words, for example, after performing a speech-to-text conversion, and storing such text within the database 4, if a search is performed using the system of the present invention for media files that contain a particular key word, the system will actually search the converted text forms of such media files. Upon identifying any text forms of such media files that contain the queried key word, it will be inferred that the media file that corresponds to the searched text file will actually contain the key word.

Figure 2:
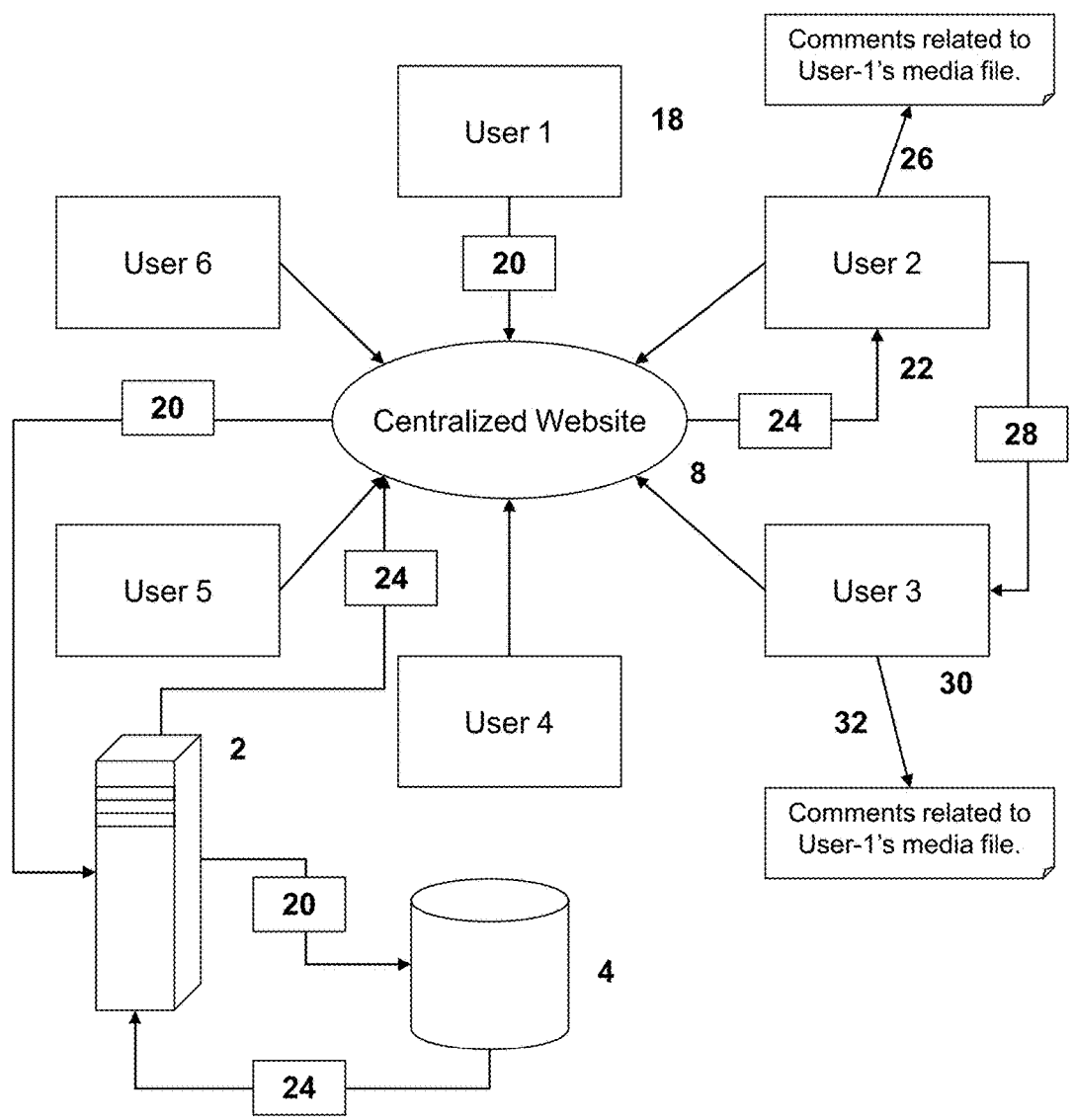
FIG. 2 is a diagram showing the interactive nature and media file sharing capability of the systems described herein.

Referring now to FIG. 2, according to certain preferred embodiments, the invention provides that the server 2 is configured to make one or more of the media files accessible to persons other than the original source (or author) of the media files. The invention provides that the term "source" refers to a person who is responsible for uploading a media file to the server 2, whereas the term "author" refers to one or more persons who contributed content to an uploaded media file (who may, or may not, be the same person who uploads the media file to the server 2). For example, as illustrated in FIG. 2, a first user (User-1) 18 may submit 20 a media file to the server 2 through the centralized website 8, which is then indexed and stored within a database 4. The invention provides that if certain conditions are satisfied, as described below, the media files that the first user (User-1) 18 records within and uploads to the database 4 will then be accessible by other persons. For example, a second user (User-2) 22 may retrieve 24 and listen to User-1's media file from the database 4 through the centralized website 8.

Upon retrieving and accessing User-1's media file, User-2 22 may publish comments 26 regarding User-1's media files within a graphical user interface of the website 8. Moreover, User-2 22 may publish comments 26 regarding certain limited portions of User-1's media files, with the relative location of such comments being quickly ascertainable within the graphical user interface of the website 8. The invention provides that the comments 26 may be submitted to the server 2 through the website 8 by User-2 22, or any other persons who are granted access to User-1's 18 original media files. The invention provides that the comments 26 will be associated with User-1's 18 original media files within the database 4, along with other information collected by the server 2, such as the identity of the user/person submitting the comments 26, the date and time of submission, and/or other relevant information.

The invention further provides that the comments 26 may be viewed by any person accessing the website 8 or, alternatively, a limited group of persons who are granted access to User-1's 18 original media files. For example, an author of a media file, and/or the person (source) who submits a media file to the server 2, may submit instructions to the server 2 which only allow certain persons to access and listen to the media file. The invention provides that such access controls may be employed if a user (or author or source of a media file) does not want a media file to be generally available to all users of the system.

Figure 3:
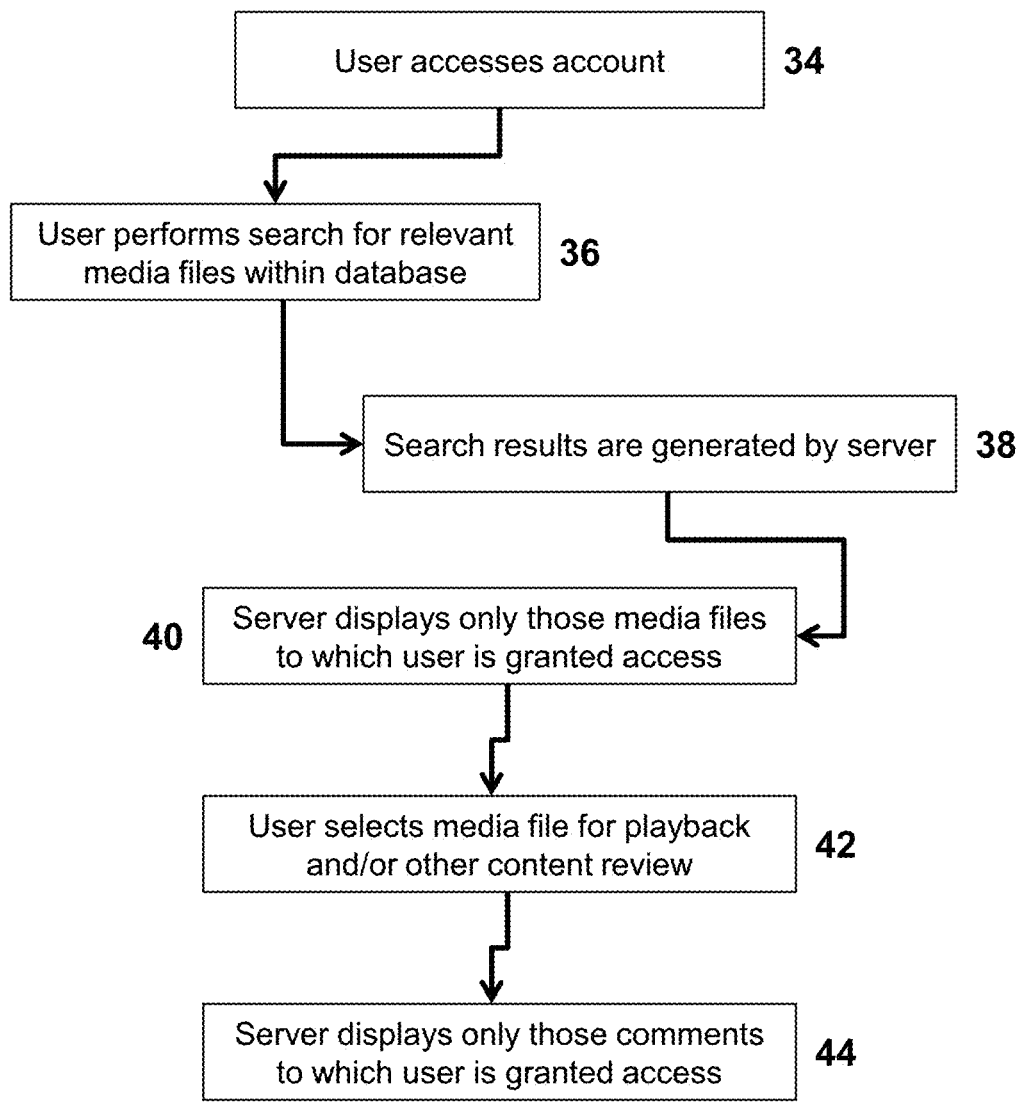
FIG. 3 is a flow chart illustrating the controls provided by the systems described herein, which allow only specified users to access certain media files and/or comments related thereto within the centralized website.

Referring to FIG. 3, for example, the invention provides that a user may access his/her account 34, by providing the server 2 with an authorized username/password through the centralized website 8. The user may then perform a search 36 of the database 4 for desired media files, namely, media files containing one or more search terms (key words), as described herein. The invention provides that the server 2 will then generate a list of results 38, i.e., media files that contain one or more of the queried search terms, and then display (within the centralized website 8) only those media files to which the user is granted access 40. The user may then select one or more media files within the viewable search results for playback and/or other content review 42. In addition, upon selecting a media file from the search results within the centralized website 8, the server 2 will display only those comments (related to the selected media file) that the user is allowed to view 44. In other words, the individuals who publish comments regarding a media file may further limit access to such comments to only authorized users of the system.

Referring now to FIG. 2, according to certain preferred embodiments, the invention provides that a user of the system, such as User-2 22, may refer 28 a media file (with or without comments 26 associated therewith) to another user. When the other user, e.g., User-3 30, receives notice of such referral 28, the other user may access and listen to the referred media file and, optionally, publish comments 32 regarding User-1's media files within a graphical user interface of the website 8. In addition, the invention provides that users of the system may share, refer, and transmit to other users a limited portion of one or more media files. For example, if a first user determines that a second user may find a particular portion of a media file to be of interest, the first user may refer only the interesting portion of that media file to the second user. According to such embodiments, the invention provides that the graphical user interface of the website 8 may include certain controls which allow a user to excise portions of a media file and refer the same to another user, e.g., by using time coordinates associated with a media file, from beginning to end, to identify and refer only the relevant portion of a media file to another user of the system. The act of referring a media file, or an excerpted version thereof, may be carried out by sending, e.g., by e-mail, a hyperlink to another individual (with the hyperlink being associated with and linked to a place in the database 4 from which the media file, or an excerpted version thereof, may be retrieved).

As mentioned above, according to certain preferred embodiments of the present invention, the system is configured to allow users to query the database 4, preferably through the website 8, for media files that include within the content thereof one or more key words. A non-limiting example of a portion of a graphical user interface showing an exemplary search function 46 is provided in FIG. 4. More particularly, the invention provides that the server 2 of the system may be configured to receive one or more key words 48 that are submitted by a user of the system through the website 8, whereupon the server 2 queries the database 4 to identify all media files which include the one or more key words 48. The invention provides that the system, and search function 46, may employ Boolean search logic, e.g., by allowing conjunctive and disjunctive searches, truncated and non-truncated forms of key words, exact match searches, and other forms of Boolean search logic.

The server 2 may then present the search results 50 to the user within the website 8 and, preferably, list all responsive media files in a defined order within such graphical user interface, but only those media files to which the user has been granted access, as described above. For example, the search results may list the media files in chronological order based on the date (and time) 52 that each media file was recorded and provided to the database 4. In other embodiments, the media files may be listed in an order that is based on the number of occasions that a key word is used within each media file. Still further, the media files may be listed based on the number of occurrences of key words in metadata associated with the media files, such as titles, description, comments, etc. In addition, the media files may be listed by measuring user activity, such as the number of views or plays, length of playing time, number of shares and comments, length of comments, etc. These criteria, combinations thereof, or other criteria may be employed to list the responsive media files in a manner that will be most relevant to the user. Still further, the invention provides that a user may specify the criteria that should be used to rank (and sort) the search results, with such criteria preferably being selected from a predefined list 54.

Figure 4:
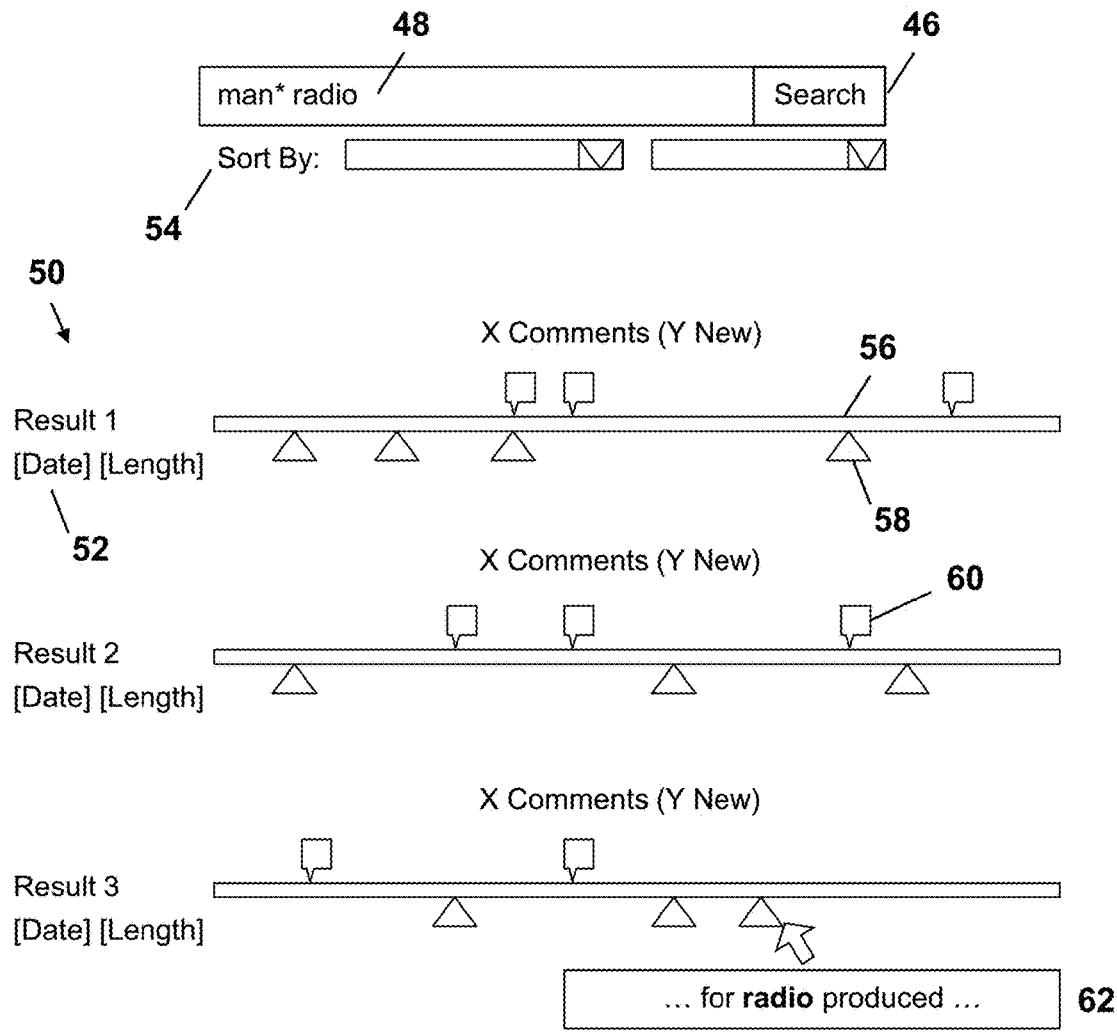
FIG. 4 is a diagram showing certain non-limiting components of an exemplary graphical user interface in which a user may query the content of a plurality of media files, identify those media files which include a certain key word (or set of key words) that the user defines, and quickly view the context in which such key word is used in one or more media files.

Still referring to FIG. 4, each media file included within a set of search results will preferably be graphically portrayed, such as in the form of a line 56 that begins at time equals zero (t=0) and ends at a point when the media file is terminated. For example, if the total length of a media file is five minutes, the left side of the line will be correlated with t=0 of the media file, whereas the right side of the line will be correlated with t=5 minutes of the media file. Still further, the invention provides that the location of each search term that was queried may be indicated along the line 56. For example, the location of each search term may be indicated with a triangle 58, or other suitable and readily visible element. The invention further provides that if multiple search terms were used in the search, the line 56 may be annotated with multiple triangles 58 (or other suitable elements), each of which may exhibit a different color that is correlated with a particular search term. More particularly, for example, if two search terms are used, the line 56 may be annotated with triangles 58 (or other suitable elements), which exhibit one of two colors, with one color representing a location of a first search term (key word) and a second color indicating the location of a second search term (key word).

The invention further provides that each line 56 that represents a relevant media file may be annotated with one or more comments 60 posted by other users, as described herein. The invention provides that such annotation of the comments 60 will preferably indicate the location within the media file to which each comment 60 relates. According to yet further embodiments, the invention provides that when a user places a cursor (within the graphical user interface of the centralized website 8) over or in the near vicinity of a triangle 58 (or other element indicating the location of a search term) or a comment 60, the graphical user interface of the website 8 will automatically publish a temporary text box 62 in which the search term may be viewed, along with a limited number of words before and after the search term (i.e., the context in which the search term is used), which were transcribed by the system from the media file.

The invention provides that the text box 62 (which contains the transcribed text) will allow a user to quickly review the context in which the search term is used, which will facilitate knowing whether the media file (or a portion thereof) may be relevant to the user and worthy of playback and/or further review. According to certain embodiments, the invention provides that a user may, optionally, control the number of words appearing before and after the search term in the text box 62, by entering the desired number of words in a specified field within the user's dedicated account page. This way, each user may adjust the size of the text box 62 in accordance with his/her personal preferences.

Figure 5:
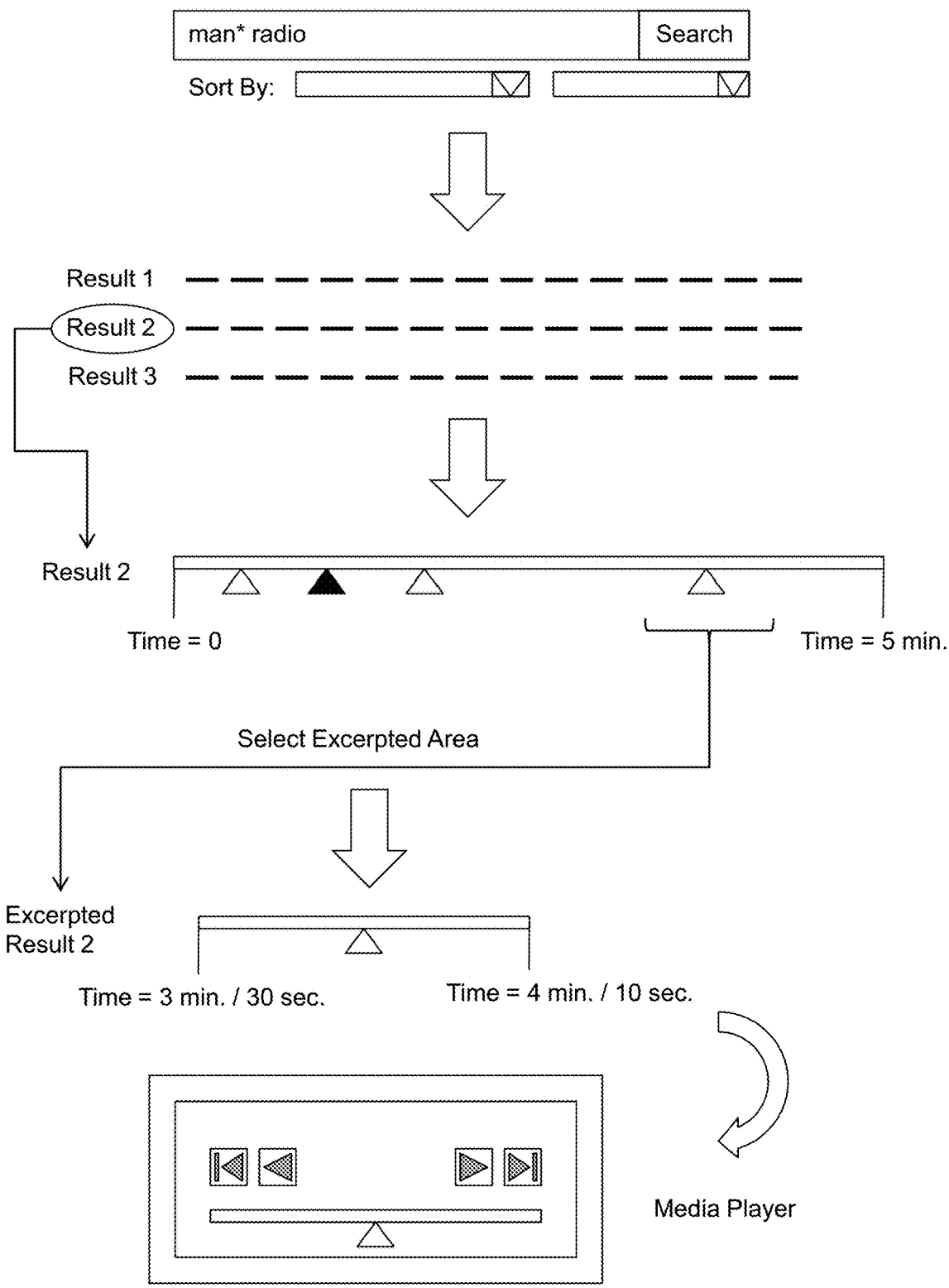
FIG. 5 is another diagram that illustrates the means by which the systems and methods described herein allow users to query a large body of media files, and then playback excerpted and relevant portions thereof using a media player.

According to still further embodiments, the present invention provides that upon selecting a media file within the search results 50, the server will publish a portion of the transcribed text that surrounds the location of a key word. According to such embodiments, upon selecting the key word (or any other word included in the published text), the server 2 will cause a portion of the corresponding audio track (audio content) to be streamed to the user's device 12,14. Here again, the audio content may begin at the exact location at which the selected key word is found within the media file or, alternatively, at a predefined period of time prior to the location of the key word. As illustrated in FIG. 5, the invention provides that each media file that is selected and streamed to a user's device 12,14 may be graphically portrayed within the graphical user interface of the centralized website 8, which may further include a media player that allows a user to control the playback of the media file (or portion thereof).

In certain embodiments, the systems and methods of the present invention will only display text that has been transcribed from a media file, which satisfies a minimum accuracy confidence threshold. The invention provides that other non-literary symbols may be used to signify the presence of certain audio-to-text conversions that do not meet the predefined minimum accuracy confidence threshold. As mentioned above, a variety of algorithms may be employed during the transcription step, including, but not limited to, algorithms that may be used to perform speech-to-text, speech-to-phoneme, speech-to-syllable, and/or speech-to-subword conversions. In certain embodiments, Hidden Markov Model algorithms may be employed to execute the transcription. The methods further comprise calculating an accuracy confidence value, which will be a quantitative measure of the estimated accuracy of the transcription of a word derived from the media file (audio content) into written text.

The server 2 may then (or at anytime following insertion into the database 4) be instructed to display a set of results for such transcription within the centralized website 8 (whether in the text box mentioned above or in other areas of the website 8), which may be viewed from a computing device 12,14,16. The invention provides, however, that such results will include transcribed words for only those words that meet or exceed a predefined accuracy confidence threshold. In other words, for each word that is transcribed from the media file, the associated accuracy confidence value for such word will be compared to the predefined accuracy confidence threshold. If the accuracy confidence value meets or exceeds the predefined accuracy confidence threshold, the transcribed word will be published within the set of results for such transcription.

As explained above, since the audio-to-text conversions may be viewed in the centralized website 8 (whether in text boxes associated with search terms or within other areas thereof), the website 8 may further include a set of controls and, particularly, a control that allows a user to quickly and easily adjust the predefined accuracy confidence threshold that is applied to a transcription (either before or after a transcription). For example, the invention provides that the website 8 may include a sliding control, which allows a user to adjust the predefined accuracy confidence threshold up and down, while simultaneously viewing the effect that such adjustment has on the number of words transcribed and the accuracy thereof.

Figure 11:
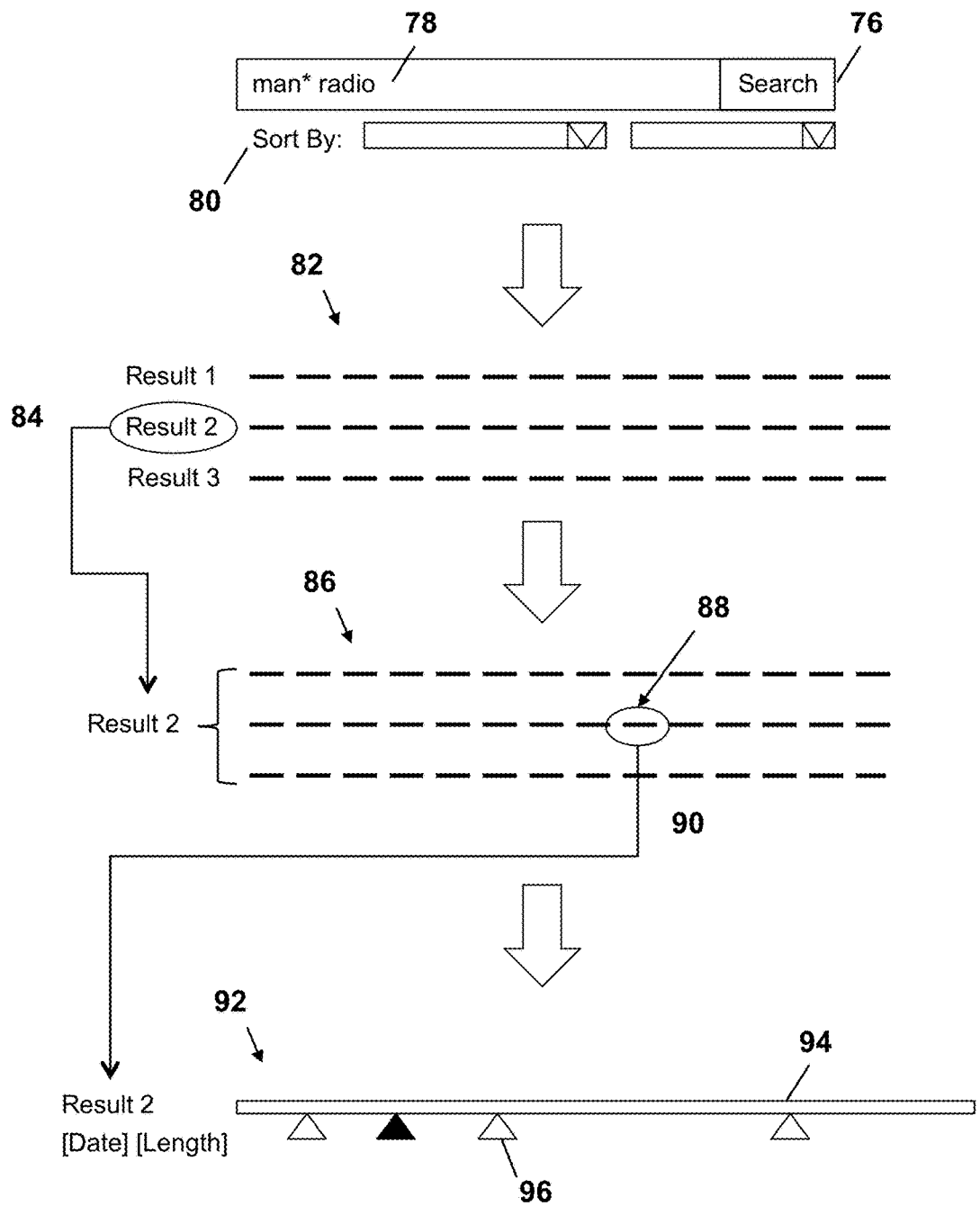
FIG. 11 is a diagram that illustrates the means by which the systems and methods described herein allow users to query a large body of media files and then playback excerpted and relevant portions thereof.

A second non-limiting example of a graphical user interface showing an exemplary search function 76 is provided in FIG. 11, which may be used to query excerpted portions of media files. More particularly, as described above, the invention provides that the server 2 of the system may be configured to receive one or more key words 78 that are submitted by a user of the system through the website 8, whereupon the server 2 queries the database 4 to identify all media files which include the one or more key words 78, and then ranks the identified media files using the ranking system and methods described herein. According to this embodiment, the audio track (audio content) that is streamed to the device will preferably begin at the location of the key word within the media file (or at a position located a pre-defined period of time prior to the first usage of the key word in the media file). The control may then be used to switch from one media file to another (e.g., down the list of search results), until a desirable media file is identified.

In such embodiments, the search results 82 will preferably consist of a list of media files that include the one or more key words. The server 2 will further provide a means for selecting 84 a media file within the search results, whereupon selecting a media file causes the server 2 to stream an audio track (audio content) to a device 12,14. The invention provides that the audio content will represent an excerpted portion of the media file that begins at (or at a predefined period of time prior to) a location of the queried key word in the audio track (audio content). In other words, referring to FIGS. 11 and 12, if a user selects a specific media file (e.g., a talk radio file) within a set of media files 82 that comprise a set of search results, the server 2 will cause a portion of the corresponding audio content to be streamed to the user's device 12,14. The audio content may begin at the exact location at which a key word is found within the audio content for the selected media file or, alternatively, at a predefined period of time prior to the location of the key word. In certain embodiments, for example, the predefined period of time, e.g., 5, 10, 15, 20, or more seconds, may be specified and adjusted by a user within the centralized website 8.

Figure 12:
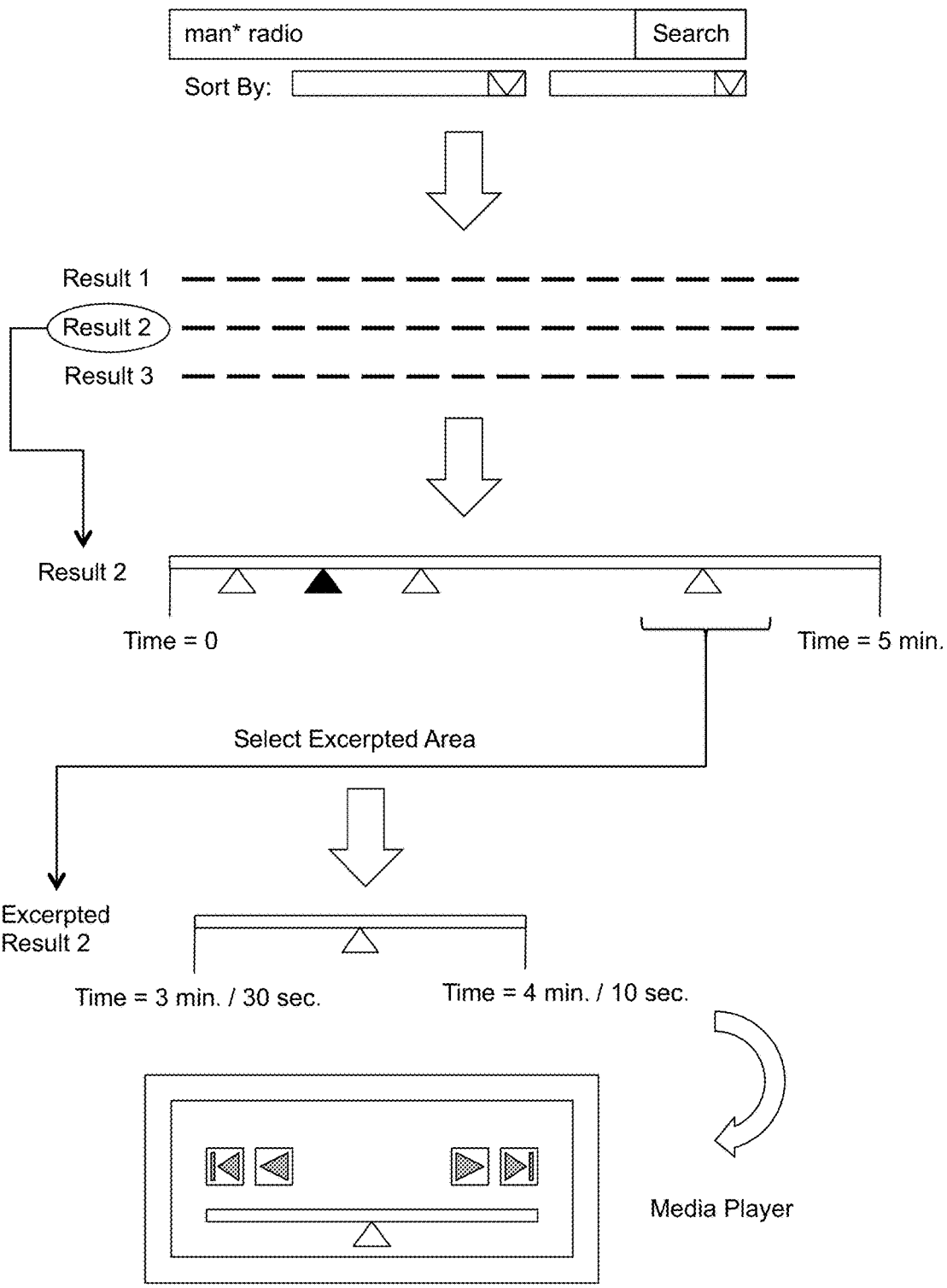
FIG. 12 is another diagram that illustrates the means by which the systems and methods described herein allow users to query a large body of media files, and then playback excerpted and relevant portions thereof using a media player.

Still referring to FIGS. 11 and 12, according to further embodiments, the present invention provides that upon selecting 84 a media file within the search results 82, the server will publish a portion of the transcribed text 86 that surrounds the location of a key word 88. According to such embodiments, upon selecting 90 the key word 88 (or any other word included in the published text 86), the server 2 will cause a portion of the corresponding audio track (audio content) to be streamed to the user's device 12,14. Here again, the audio content may begin at the exact location at which the selected key word 88 is found within the media file or, alternatively, at a predefined period of time prior to the location of the key word 88.

Referring to FIG. 11, and as described above relative to other embodiments, each media file that is selected and streamed to a user's device 12,14 may be graphically portrayed 92 within the graphical user interface of the centralized website 8. For example, the entire media file (or an excerpted portion thereof) may be portrayed in the form of a line 94 that begins at time equals zero (t=0) and ends at a point when the media file is terminated (or begins at a predefined period of time prior to the first use of a key word and ends at a predefined period of time following the last use of a key word). Still further, in certain preferred embodiments, the invention provides that the location of each key word that was queried may be indicated along the line 94. For example, the location of each search term may be indicated with a triangle 96, or other suitable and readily visible element. Still further, referring to FIG. 12, the invention provides that an entire media file, from beginning to end, may be graphically portrayed (as described above), as well as a selected excerpted portion thereof—and optionally played back and visualized within a media player.

Key Word Search Functionality

According to certain preferred embodiments of the invention, the search functionality of the system may employ an auto-complete feature. For example, the search functionality may utilize an auto-complete drop-down menu, which lists various proposed key words that may be used to perform the search. The invention provides that these proposed key words will preferably represent the most relevant key words, as determined by the server 2 of the system. The server 2 of the system will maintain a running log of the most relevant key words (identified and extracted from text using the analytics methods described below), which have been transcribed from one or more media files that have been indexed within the system as described above. In certain embodiments, the search functionality may also be configured to automatically present a list of proposed key words when a user clicks a search bar (or places a cursor in a search text field). When and if a user selects any of the proposed key words that are presented in the auto-complete feature described above, the system will automatically conduct a search of the plurality of media files using the selected key words.

The system will preferably employ an algorithm (or other means) for proposing the most frequently searched and information-rich key words in the auto-complete feature. In other words, the system will preferably factor both of those criteria when calculating its proposed list of key words, which will thereby create a list of proposed key words that are most relevant to a user of the system. The system will maintain a record of the key words that are most frequently search by users of the system. In addition, the system will continually analyze the transcripted text from all media files, preferably using the analytics methods described below, which are provided to the system, as the files are being indexed therein. In addition, the system will be configured to analyze the transcripted text from all media files that are present in a set of search results generated by users over a period of time. This way, the above-referenced algorithm will be capable of assigning a score to various words (potential key words) included within such text. This scoring technique may also be applied to adjacent word pairs, or longer sequences of words (e.g., phrases and the like). The criteria that are factored into such scores may include, but are not limited to, the frequency of such key words in a body of text, the length of text in which the key words are present, the nature of the speech in which such key words are found, whether a particular word is a "stop word," and others.

The system will maintain a running aggregation of scores for a body of key words (or, as mentioned above, groups of key words), with such aggregation being calculated across multiple bodies of texts derived from the media files provided to the system. The system may prioritize and rank key words by calculating a mean score value for each key word (or groups of key words) across the plurality of texts (media files) analyzed. The system may then rank such key words based on the calculated mean score values. The invention provides that the system may prioritize and rank key words by other means as well, provided that the goal of such ranking system is to present to a user of the system a set of proposed key words that are possibly the most relevant to the user, based on the most frequently searched and information-rich key words identified by the system.

Audio Content Organization and Analytics

According to yet further embodiments of the present invention, the systems described herein further comprise improved means for analyzing and filtering media files and the audio content included therein. These methods are particularly useful for identifying, and suggesting, relevant key words for users, as described above. In such embodiments, the server 2 will be configured to treat the audio content of media files as a collection of individual words, sequential word pairs, sequential word triples, and so on. This collection of words may be considered (in a mathematical sense) as a multiset, such that each item (i.e., word, word pair, word triple, etc.) is associated with a frequency of occurrence.

Figure 6:
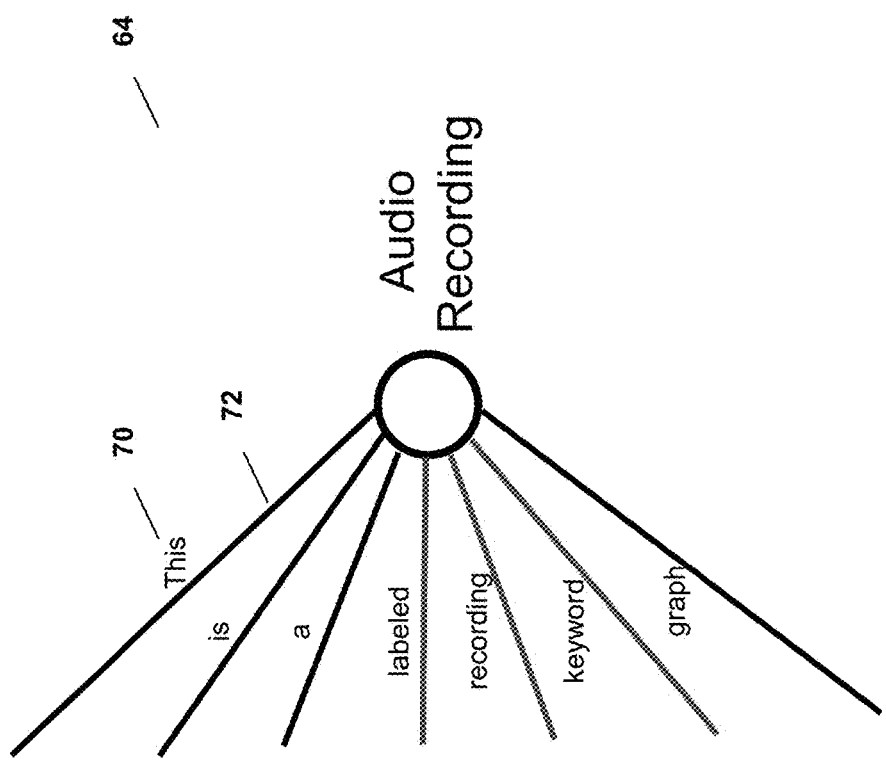
FIG. 6 is a non-limiting example of a graph vertex described herein, which is correlated to a specific media file (audio recording), which illustrates the words that are assigned (labeled) to the various edges shown therein.
Figure 7:
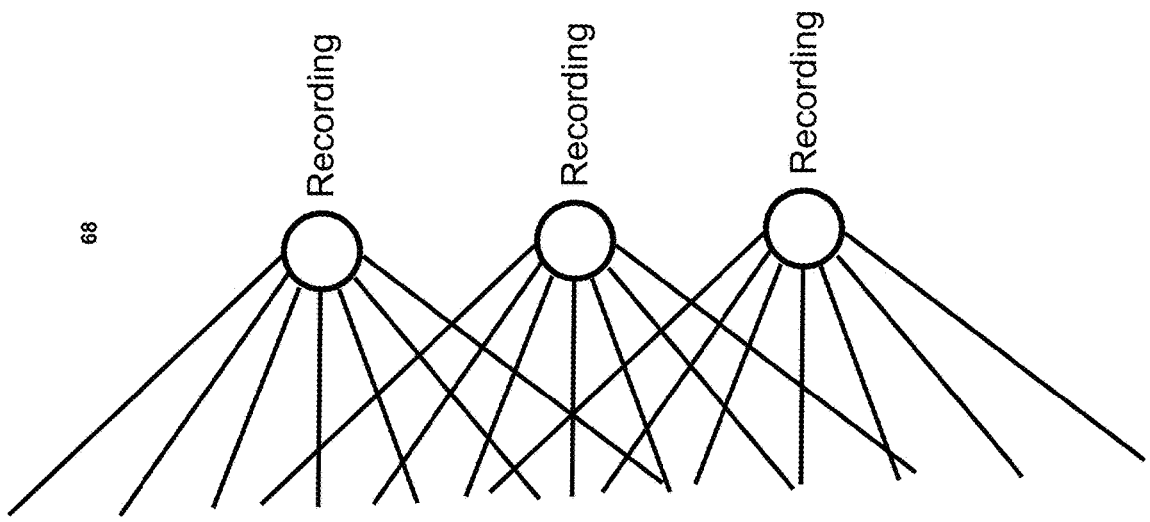
FIG. 7 is a non-limiting example of a plurality of vertices of a bipartite graph described herein, with several vertices oriented in a left column that are correlated to an individual (i.e., a speaker, media file uploader, or commenter) and several vertices oriented in a right column that are correlated with specific media files (audio recordings).
Figure 7:
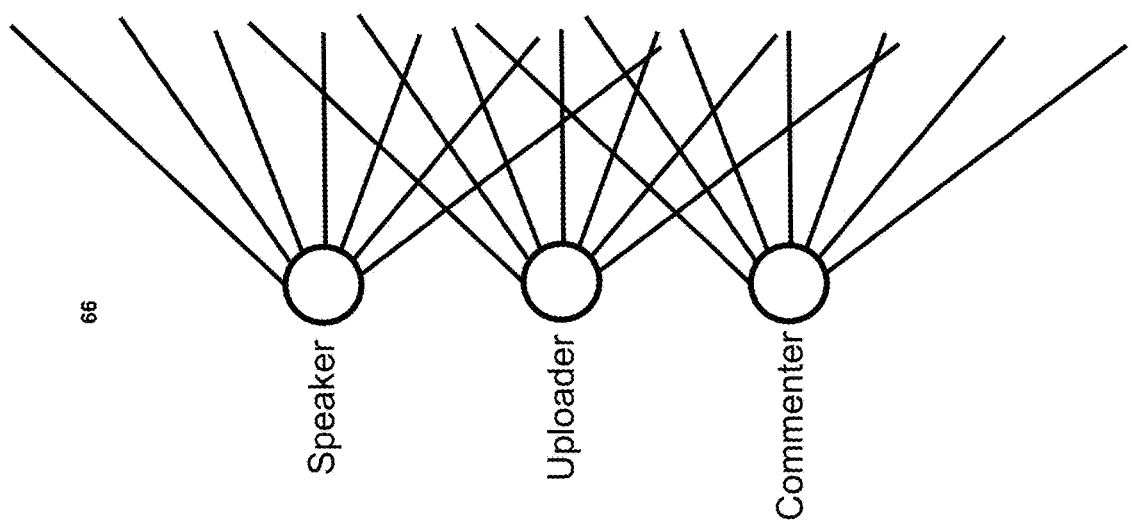
Figure 8:
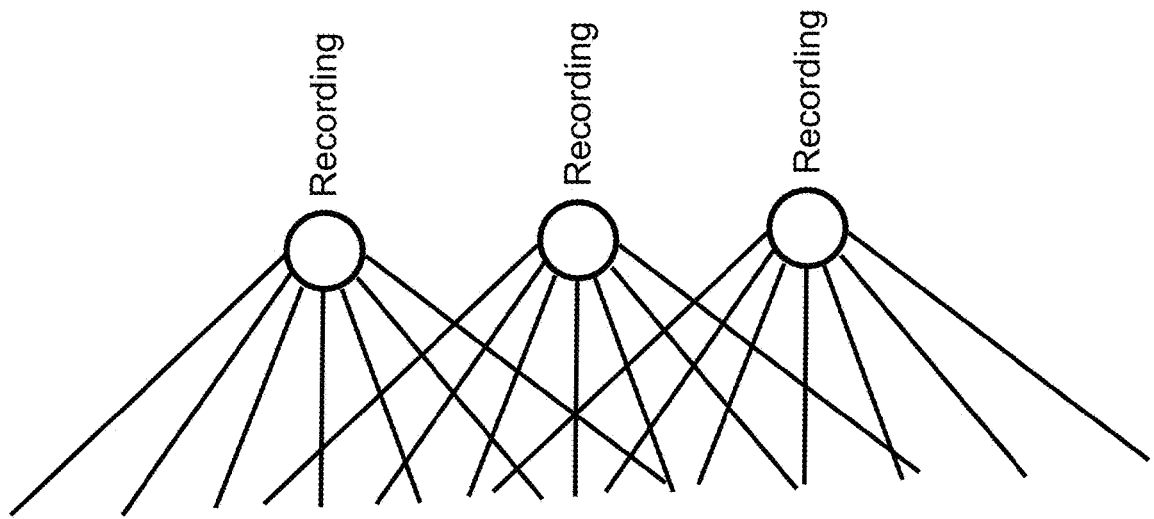
FIG. 8 is a reproduction of the vertices shown in FIG. 7, in which a user has performed an operation that identifies several relevant key words (e.g., high-frequency key words) within the edges (shown in red) of the vertices that are correlated with a speaker of certain audio content.
Figure 8:
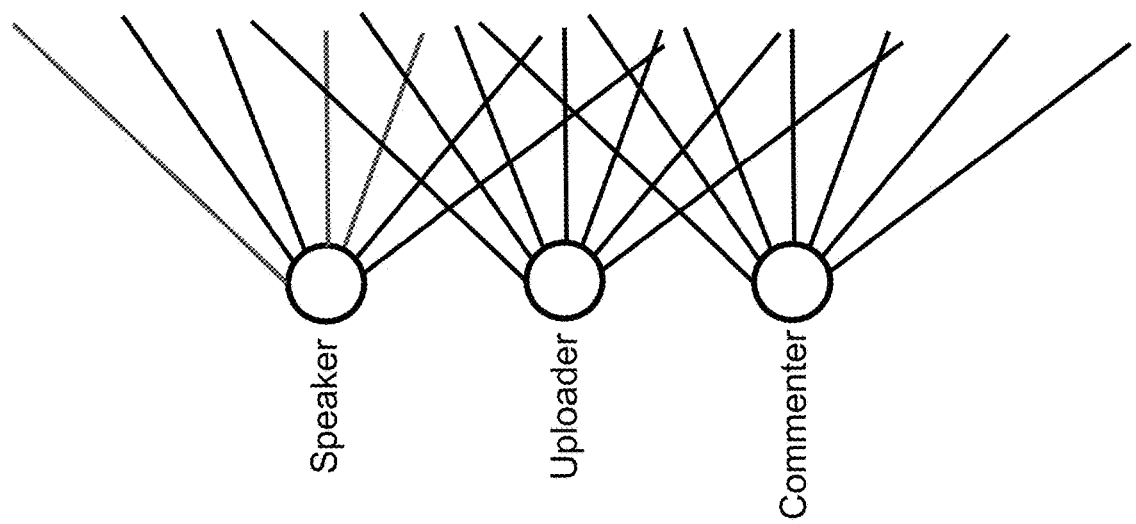
Figure 9:
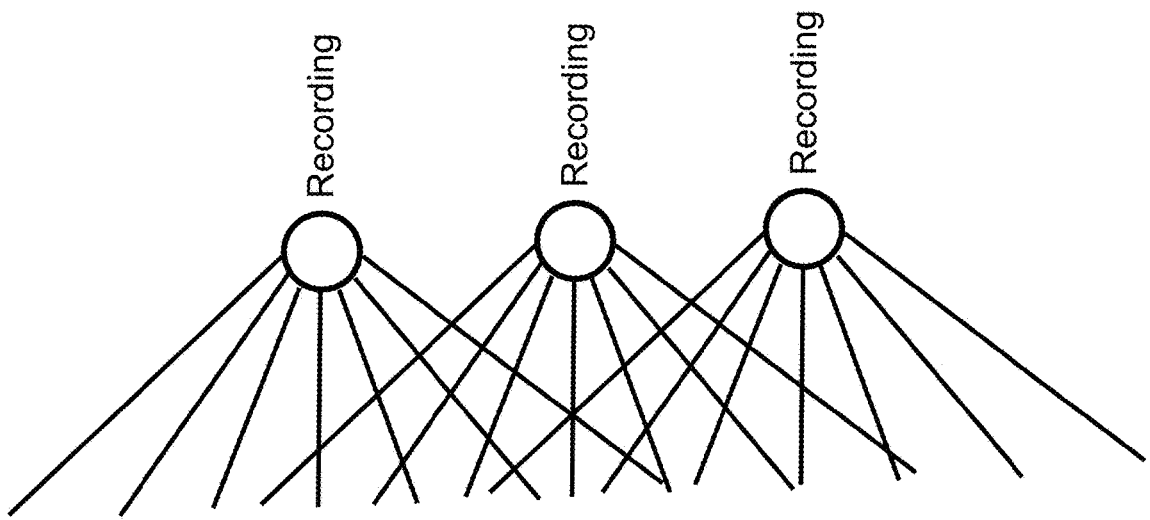
FIG. 9 is a reproduction of the vertices shown in FIG. 7, in which a user has performed an operation that identifies several relevant key words (e.g., high-frequency key words) within the edges (shown in red) of the vertices that are correlated with an individual who uploaded the subject media file.
Figure 9:
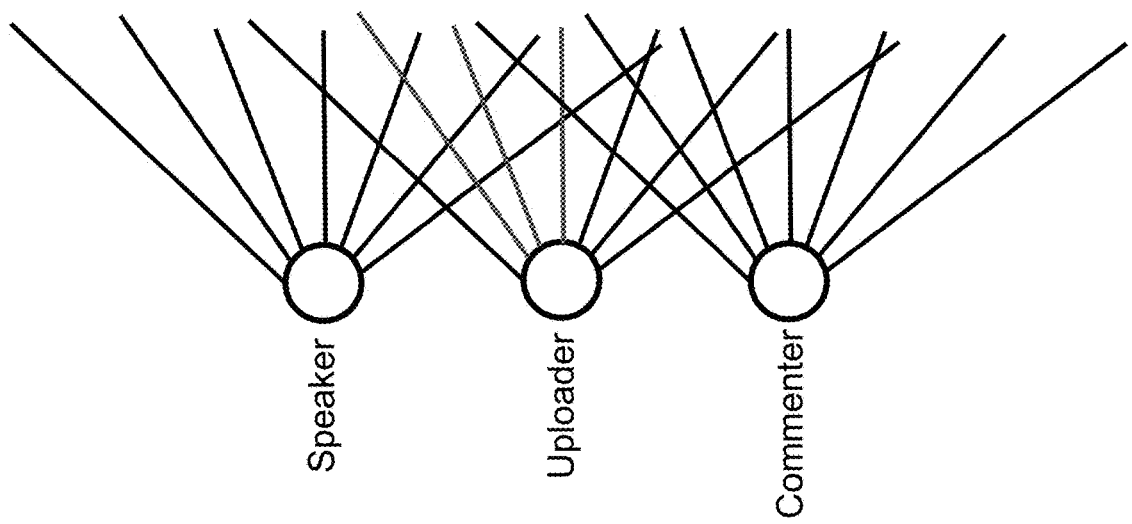
Figure 10:
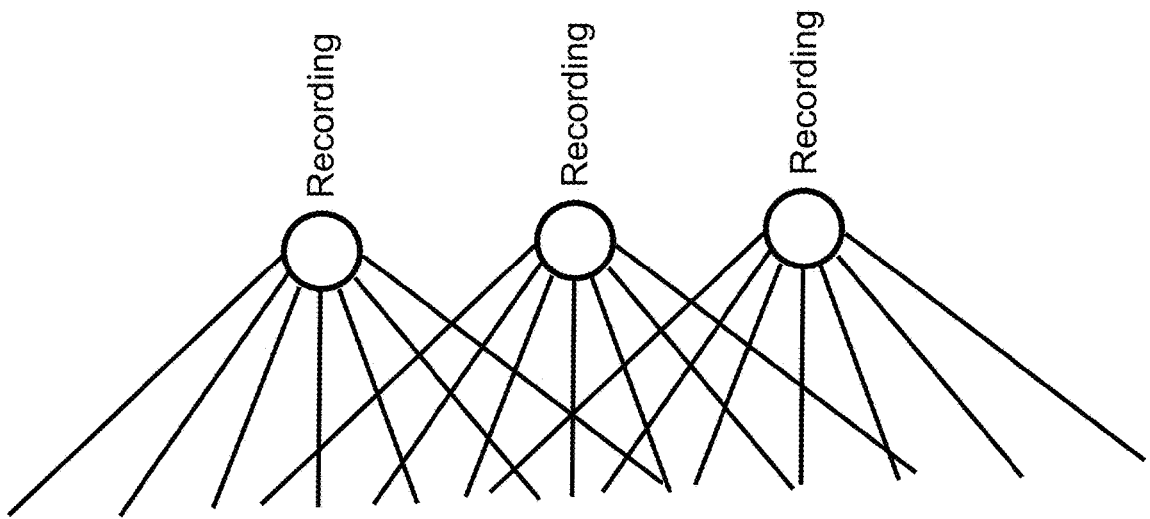
FIG. 10 is a reproduction of the vertices shown in FIG. 7, in which a user has performed an operation that identifies several relevant key words (e.g., high-frequency key words) within the edges (shown in red) of the vertices that are correlated with an individual who published and associated comments with the subject media file.
Figure 10:
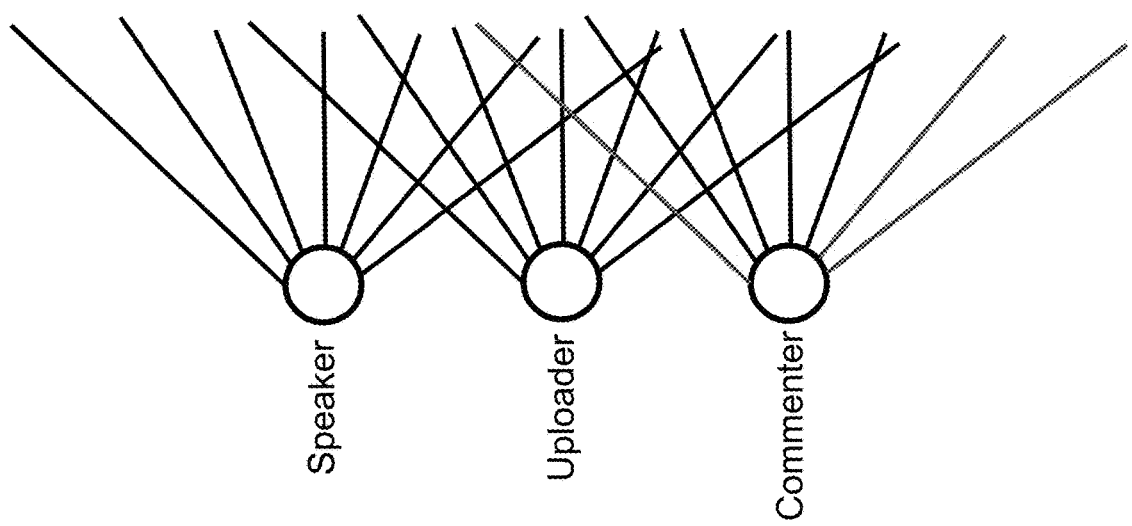

According to such embodiments, and referring now to FIG. 6, the system will be configured to construct a vertex 64 for each media file (or, more particularly, the audio content included within such media files). Similarly, the system will construct at least one vertex 64 for at least one of the individuals who may be associated with each such media file/audio content (FIG. 7). The association between an individual and audio content may be, for example, (1) that the individual is a speaker in the audio content (i.e., a participant), (2) the individual was responsible for uploading the media file to the system (i.e., a person managing an account within the system described herein), (3) the individual was a recipient of the media file (i.e., it was referred 28 to the individual by another), (4) the individual accessed the particular media file and listed to the audio content thereof, or (5) the individual published comments 26 about the media file. Referring to FIG. 7, these vertices 64, when being used for the analysis described herein, may be oriented separately, e.g., with the vertices pertaining to individuals in a first left column 66 and the vertices associated with the media files/audio content in a second right column 68.

As illustrated in FIG. 6, the invention provides that spoken words (and word pairs, word triples, etc.) 70 that are detected within the audio content of a media file may be assigned as labels to the edges 72 of the vertices 64, which are constructed for each of the plurality of media files that are provided to the system. Likewise, the spoken words 70 that are detected within such audio content may be assigned to the edges 72 of the vertices 64 that are constructed for the individuals who are speaking such words. The invention provides that the system may apply relevancy values to such words 70, whereby words 70 that represent pronouns, verbs, and subject-intensive words are considered more relevant than, for example, conjunctive words, prepositions, and the like.

Although other data organization methods can be used in the present invention, the types of graph structures described herein (and shown in FIG. 7)—between the audio content within media files and the individuals who are correlated with such content—allow the words 70 detected therein to be organized and utilized in various ways that are amenable to the application of various key word extraction algorithms to such multisets. That is, by constructing and analyzing these types of vertices for people and audio content, in which the vertices are people on the one hand (e.g., in a left column 66) and audio recordings on the other (e.g., in a right column 68), with the edges 72 of such graphs that connect people and audio content representing words, the system will be configured to offer a new collection of words (across multiple media files and/or associated individuals) that can be subjected to any of various key word extraction algorithms, such as those discussed above.

The invention provides that the above methods may be used for identifying words, within the audio content of media files, which exhibit a high frequency of access by others (e.g., the most listened to portions of the audio content of a media file). For example, at the instruction of a system user, the server 2 may identify the media files having the highest frequency of playback, and then analyze the contents of such files for words 70 (which may be assigned to the edges 72 of the vertices 64 described herein) that are found to be present in multiple, or a defined minimum number of, such frequently played media files. In another example, the system may be instructed to identify relevant key words for a particular individual. More particularly, the system may query the words assigned to the edges 72 of the vertices 64 that are assigned to a particular individual, and identify those words 70 that are most frequently spoken or used by such individual.

The invention further provides that the system may be configured to apply additional (secondary) labels to the edges, between audio content of media files and individuals. More specifically, in one example, the system may assign a speaker label to a particular edge, to indicate that a specific individual is speaking within the corresponding audio content. In addition, for example, a share label may be assigned to a particular edge, in order to signal that an individual received access to the corresponding audio recording from a third party (i.e., that it was referred 28 to such individual). The invention provides that a podcast label may be assigned to audio content, to indicate an RSS source that should be correlated thereto. Still further, the system may apply comment labels to graphs that correspond to particular audio content, in order to indicate that certain commentary 26 (text) has been associated with such audio content by a user of the system. Of course, the invention further provides that a frequency label may be applied to the edges of the graphs described herein, which represents the number of times that defined portions of audio content have been accessed by users of the system.

The invention provides that at least three different types of mathematical operations may be used to combine edges from a bipartite graph (or set of graphs) into different and usable multisets. First, a union operation may be employed, which works by combining multisets. More particularly, the frequency of occurrence of a word (which appears more than once) may be calculated as the sum of such frequencies across a plurality of individual multisets. Second, a type of intersection operation may be employed, whereby only the words (and corresponding frequencies) that are shared among a plurality of multisets are preserved and utilized. Third, a type of filter operation can be used, whereby only the words (and corresponding frequencies) that are labeled according to a user's filter criterion are preserved and utilized.

In view of the foregoing, the invention provides that unique forms of key words can be identified, extracted, and used by the system. For example, a set of podcast key words may be extracted, by identifying the union (i.e., applying a union operation as described above) of high-frequency words, among a set of media files (sets of audio content), which exhibit the same podcast label. Similarly, a set of heat map key words can be extracted, by conducting an intersection operation across key words (having high frequency values) among a plurality of media files—or among the most commonly listened to portions of such media files. In addition, the invention provides that unheard key words may be extracted, which will represent the product of a union operation that identifies a set of key words that are present across a plurality of media files, which have not yet been heard by users (i.e., having no frequency counts). Still further, the invention provides that a set of comment key words may be extracted from the segments of media files that are associated with third party comments 26. Likewise, personal or account key words can be extracted by identifying all high-frequency key words that are assigned to the edges of the vertices described herein, which are correlated to a single person (as opposed to a media file) or a single user account. Finally, the invention provides that speaker key words may be extracted, which may represent an intersection of audio content and personal key words, and which are restricted to words within a single media file for a particular speaker.

As mentioned above, a primary benefit of the methods described herein is the ability to organize audio content and, more particularly, the words included in such content. This type and level of organization enables the system to execute unique key word extraction algorithms, to identify and even suggest to a user of the system which key word(s) may be relevant to the user (or to otherwise efficiently convey to a user the predicted content of various media files). These unique forms of key words may include many of those referenced above (and others), such as key words that are unique to an individual (or account holder in the system), as well as podcast key words, key words associated with particular speakers, key words derived from unheard content, the heat map key words described below, and key words associated with individuals who have been identified as high-frequency media file listeners, providers, or contributors of content.

The invention provides that the content analysis and key word identification methods described in the section above may be used in a cloud-based system as described or, alternatively, such methods may be used outside of a cloud-based system (e.g., used internally within an organization). In the latter case, the system may generally comprise (1) a means for individuals to upload media into the system and to annotate it; (2) a means for the system to extract the content from within the media; and (3) a means to store and serve the media to users of the system.

Still further, it should be noted that such methodology may be applied to not only audio content (or media files that contain audio content), but also basic text files that are not necessarily the product of an audio-to-text transcription (as described further below). That is, the invention provides that the content analysis, and key word extraction techniques, described above can be applied to original text files. The key word extraction algorithms described herein are independent of any media file requirements, and may be applied to any text.

Audio Segmentation Systems and Methods

According to further embodiments of the present invention, systems and methods for segmenting portions of the audio tracks included within the media files described above are provided. More particularly, in such embodiments, the server 2 is configured to analyze and segment the content of a single media file into semantically relevant and similar parts, based on information that is extracted from the media file itself. For example, the server 2 can be configured to identify and segment into distinctive parts: (1) audio content that is correlated with a particular speaker (or group of speakers); (2) certain recognized key words (search terms) that are included in a media file; (3) non-verbal sounds and emotions derived from the recorded waveforms of a media file; and/or (4) user activity that is associated with a media file, e.g., the number of comments 26/60, listens (playbacks), or shares (referrals 28) that are associated with a particular media file.

Figure 13:
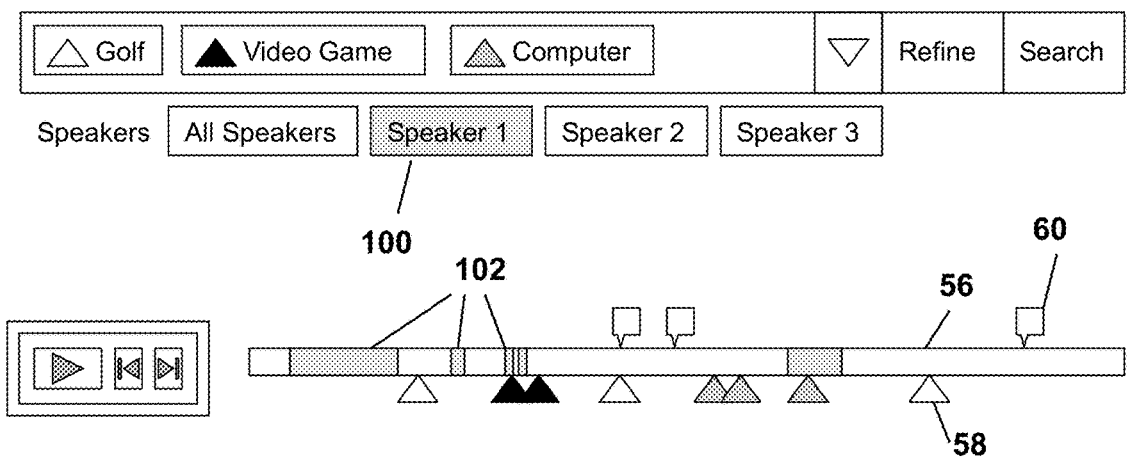
FIG. 13 is a diagram that illustrates a graphical user interface in which the audio segmentation functionality described below is being used, which identifies the segments of a single media file that are correlated with a particular speaker (or group of speakers).

For example, referring to FIG. 13, the server 2 may be configured to generate vocal signatures that are correlated with different speakers, which enable the server 2 to identify and cluster segments of a media file that are associated with a particular speaker (or multiple speakers). In certain embodiments, the graphically portrayed line 56 that is correlated with a particular media file may exhibit multiple colors, with each color identifying a segment of the media file in which a different person is talking. For example, in FIG. 13, a user may select 100 a particular speaker from several different speakers who contribute audio content to a single media file, whereupon the line 56 will graphically display the segments 102 of the media file in which the selected speaker 100 is talking, e.g., the segments 102 of the media file, illustrated in the line 56, will exhibit a color that is different than the other parts of the line 56.

Figure 14:
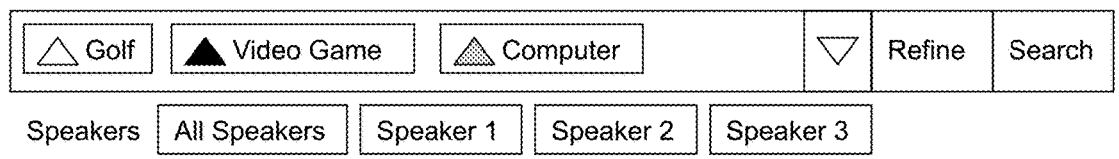
FIG. 14 is a diagram that illustrates a graphical user interface in which the audio segmentation functionality described below is being used, which identifies the segments of a single media file that are correlated with higher (or lower) energy levels.
Figure 14:
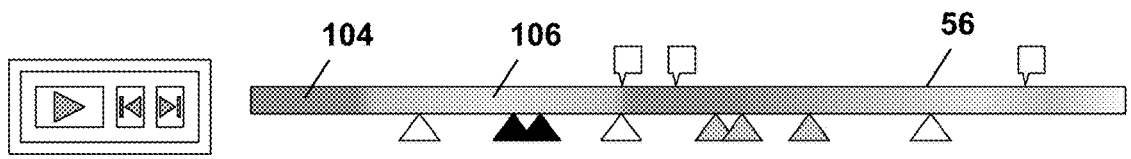

According to additional embodiments, the server 2 may be configured to segment a media file based on the energy of the waveforms contained in a particular media file. Such waveforms can be measured in the aggregate, using transforms such as the discrete cosine transform (DCT) or fast-Fourier transform (FFT). According to these embodiments, as illustrated in FIG. 14, the timeline 56 that is correlated with a particular media file may exhibit multiple colors, or even a gradient of colors, which depict the relative energy that is calculated to be associated with different segments of a media file. For example, and referring to FIG. 14, the invention provides that segments of the media file that exhibit higher energy levels than others may be darkened 104, whereas segments of the media file that exhibit relatively lower energy levels may be lightened 106. As such, a visual gradient is applied to the timeline 56, which immediately communicates to a user of the system those segments of the media file that exhibit more (or less) energy. The invention provides that such visual representations of the timeline 56 may, optionally, be widened or narrowed by a user of the system, in order to adjust the impact of the energy that is identified within the media file.

According to additional embodiments of the invention, various types of user events may be visually reflected in a timeline 56 that is correlated with a particular media file. For example, the invention provides that the number of playbacks (listens), shares (referrals) 28, or comments 60, which are associated with a particular media file (or excerpt thereof) may be visually represented in a timeline 56. In these embodiments, the server 2 may calculate a sum total number of playbacks (listens), shares (referrals) 28, and/or comments 60, and then score the frequency of such metrics to generate a gradient map of such user events, with the gradient being published in monochrome (as in FIG. 14) or in a blue-red-yellow fashion (as illustrated in FIG. 15) to provide a type of "heat map" appearance.

Figure 15:
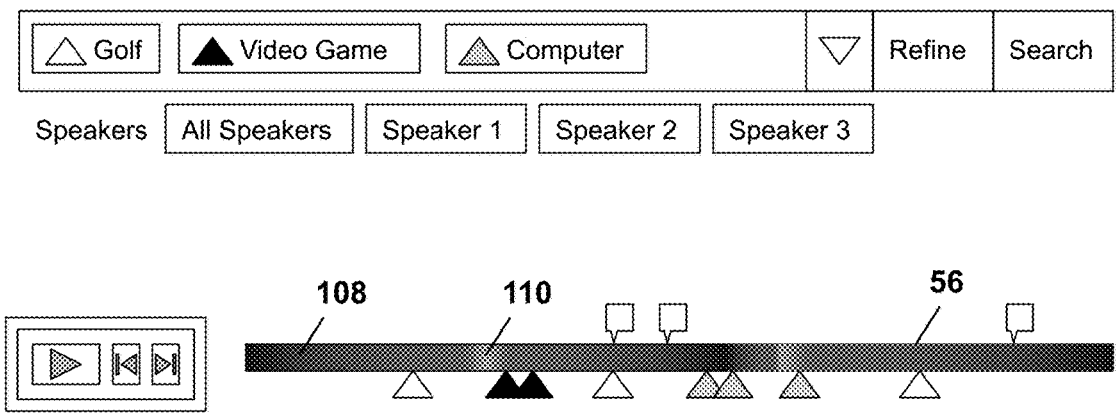
FIG. 15 is a diagram that illustrates a graphical user interface in which the audio segmentation functionality described below is being used, which identifies the segments of a single media file that are correlated with a higher (or lower) frequency of certain user events, such as the number of media file playbacks, comments, or media file sharing activity.

Referring to FIG. 15, a blue color 108 may designate a segment of the media file that is correlated with a relatively low amount of user events, whereas a red-to-yellow area 110 may designate a segment of the media file that is correlated with a relatively high amount of user events. This type of "heat map" visualization feature allows users to visually and quickly determine which segments of a particular media file are most frequently played back, commented upon, shared, or otherwise referenced by others. The invention provides that each type of such user events, e.g., playbacks (listens), shares (referrals) 28, or comments 60, may be scored based upon different scales—with each scale taking into account the relative amount of user effort that is required to complete the activity.

Figure 16:
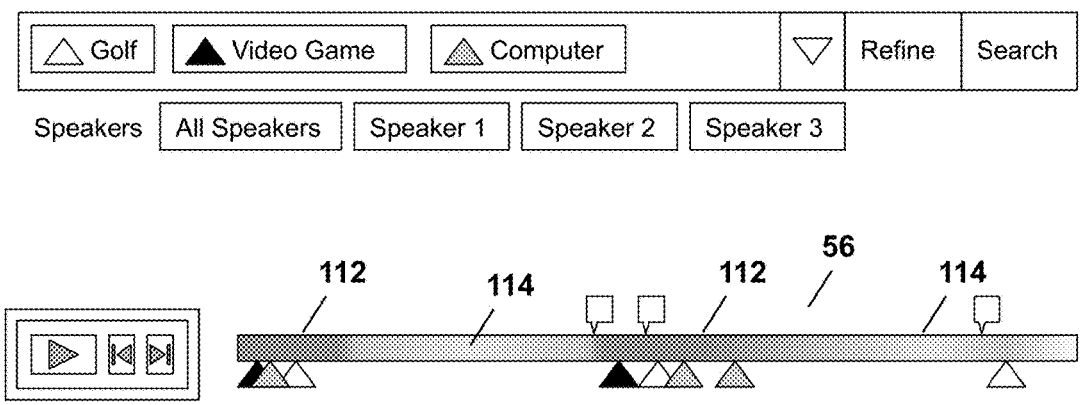
FIG. 16 is a diagram that illustrates a graphical user interface in which the audio segmentation functionality described below is being used, which identifies the segments of a single media file that are correlated with higher (or lower) concentrations of key word usage (or clusters of multiple key words).

According to yet further embodiments, the invention provides that a gradient may be applied to the a timeline 56 that is correlated with a particular media file, which designates those segments of a media file that exhibit a relatively higher concentration of key word usage. For example, and referring now to FIG. 16, a monochromatic (or colored) gradient may be applied to the timeline 56, which shows segments of the media file having a relatively higher concentration 112 of a particular key word (or group of key words) in a first color (e.g., a darker color), with the other areas of the timeline 56 that exhibit a lower concentration 114 of a particular key word (or group of key words) in a second color (e.g., a lighter color).

Figure 17:
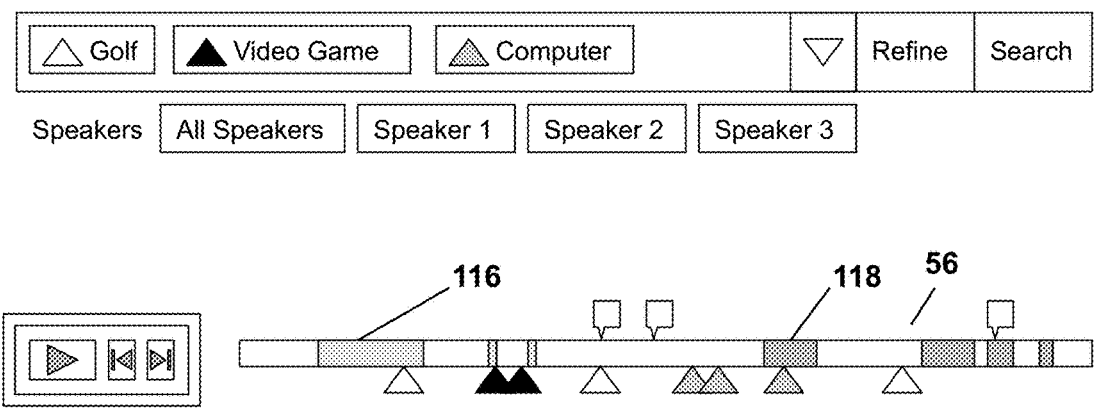
FIG. 17 is a diagram that illustrates a graphical user interface in which the audio segmentation functionality described below is being used, which identifies the segments of a single media file that are correlated with non-speaking and/or non-vocal content, e.g., laughing, crying, applause, background noise, etc.

Referring now to FIG. 17, the invention further provides that the timeline 56 may be visually annotated to identify the segments of a single media file that are correlated with non-speaking content (e.g., laughing or crying) and/or non-vocal content (e.g., applause or background noise). For example, the timeline 56 may designate and label a segment of a media file in which one or more individuals are laughing with a first color 116, and other portions of the same media file in which one or more individuals are applauding with a second color 118.

The invention provides that the media file segmentation and visualization features described above may be used in isolation, e.g., any of the segmentation and visualization features described above may be used by itself. In other embodiments, the system may allow a user to utilize two or more of these segmentation and visualization features at the same time.

Metadata Capture and Utilization Systems and Methods

Figure 18:
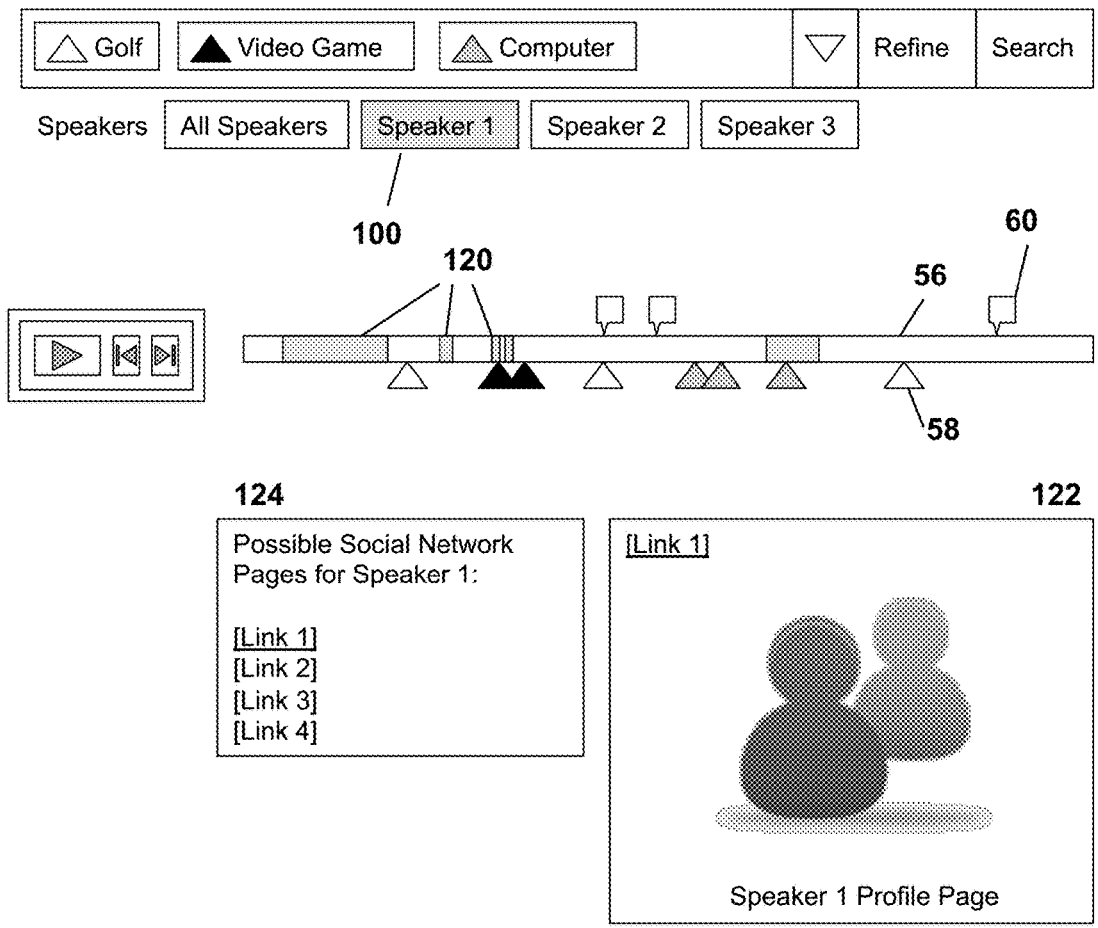
FIG. 18 is a diagram that illustrates a graphical user interface of the system described herein, which exemplifies the system's ability to retrieve and publish a social network profile page for a speaker who is identified within a media file.

According to further embodiments of the present invention, systems and methods are provided for capturing and utilizing metadata that are associated with a plurality of media files that are provided to the systems described herein. According to certain preferred embodiments, in a first example, the invention provides that the server 2 may be configured to monitor and detect voice signatures that may be correlated with each speaker who contributes audio content to a plurality of media files stored within the database 4. The invention provides that the server 2 may correlate each unique voice signature with a specific speaker, and record such correlation in the database 4. The system may further be configured to assign an identity to each speaker, either based on a person's name that is referenced within the audio content of the media file or by manual input from a user of the system. Accordingly, and as illustrated in FIG. 18, the timeline 56 that represents a particular media file may visually annotate 120 those portions of the audio content that each identifiable speaker 100 contributed.

In addition, according to certain embodiments, the system may be configured to identify sources of information and data (external to the system) that are relevant to a particular speaker who has contributed content to a media file. For example, and referring to FIG. 18, upon identifying the voice signature that applies to a particular speaker who is contributing content in a particular media file, the server 2 will conduct an automatic query of one or more social networks, in search for a profile page 122 that may be relevant to such speaker. Once the server 2 identifies a potentially relevant profile page 122 for such speaker, the server 2 may publish the profile page 122, or a portion or summary thereof, within the graphical user interface of the website 8. Once the server 2 establishes a connection between a particular speaker (based on his/her voice signature) and one or more social network profile pages 122, the server 2 may record the location of and links to such pages within the database 4 for future retrieval—when, and if, the speaker's voice signature is detected in other media files in the future. The links 124 to such one or more social network profile pages 68 may also be published within the website 8.

Still further, the invention provides that the server 2 may establish such connections with external profile pages 122 for persons who are verbally identified within the content of a media file. For example, if a first person 100 is verbally identified (or verbally identifies a second person) within the content of a media file, the server 2 may search for and publish a profile page 122, or a portion or summary thereof, within the graphical user interface of the website 8, which relates to such verbally identified person. The invention provides that when searching a plurality of social network sites for profile pages 122 that are relevant to a particular media file, such queries may also take into account the geographical metadata (discussed below) that are also obtained for the particular media file.

Figure 19:
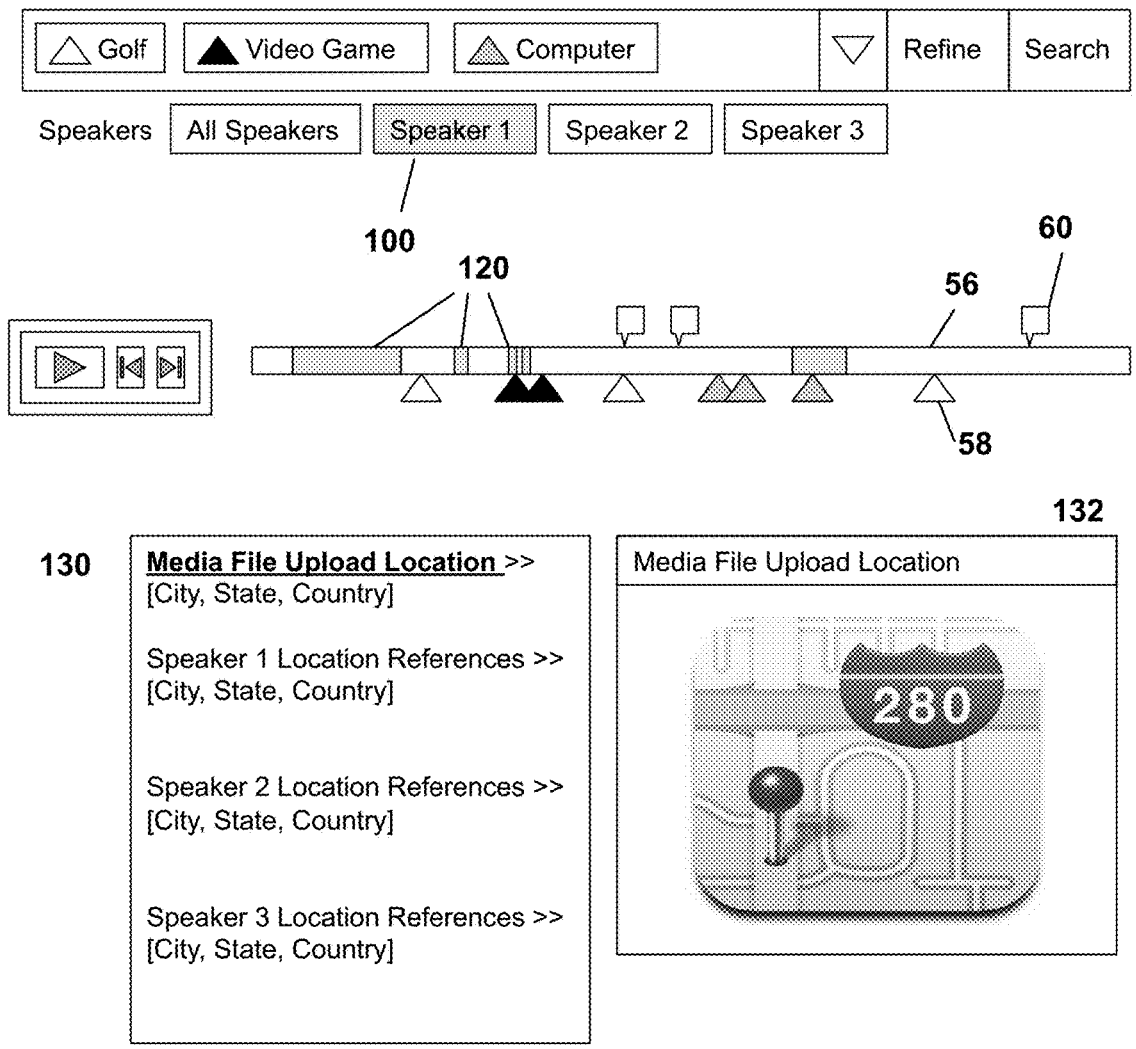
FIG. 19 is a diagram that illustrates a graphical user interface of the system described herein, which exemplifies the system's ability to retrieve and publish geographical source information regarding each media file.

Referring now to FIG. 19, according to additional embodiments, the invention provides that the server 2 may be configured to identify and correlate a media file, and/or related comments 60, to a particular geographical area. More specifically, the invention provides that when a media file is created by (or through) a mobile phone device 14, which is equipped with a global positioning system (GPS), when such media file is uploaded to the server 2 through the website 8, the server 2 will detect and record the geographical location from which the media file is being uploaded to the server 2/database 4. As such, when the media file is later selected from a set of search results 50 by a user of the system, the website 8 will display the geographical location 130 from which the media file was uploaded to the system. Similarly, the invention provides that when a personal computer 12 (including tablet computers) is used to upload a media file to the server 2 through the website 8, the server 2 may, if certain conditions are satisfied, detect and record the geographical location of such personal computer 12 vis-à-vis the internet protocol address.

In related embodiments, the server 2 may be configured to detect the presence of spoken words that are contained in a media file. More particularly, the invention provides that the system may communicate to a user that, within the content of a particular media file, a speaker made one or more references to a particular geographical location, which may take the form of cities, states, countries, or specific places of business, recreation, entertainment, etc. In such embodiments, upon the server 2 detecting such content within a media file, when the media file is later selected from a set of search results 50 by a user of the system, the website 8 will display the geographical location (or places) that are referenced in the media file. In this embodiment, and the GPS-related embodiment described above, the website 8 may further display a map 132 of such geographical location 130, with such map 132 being streamed into the website 8 from a third party source.

Figure 20:
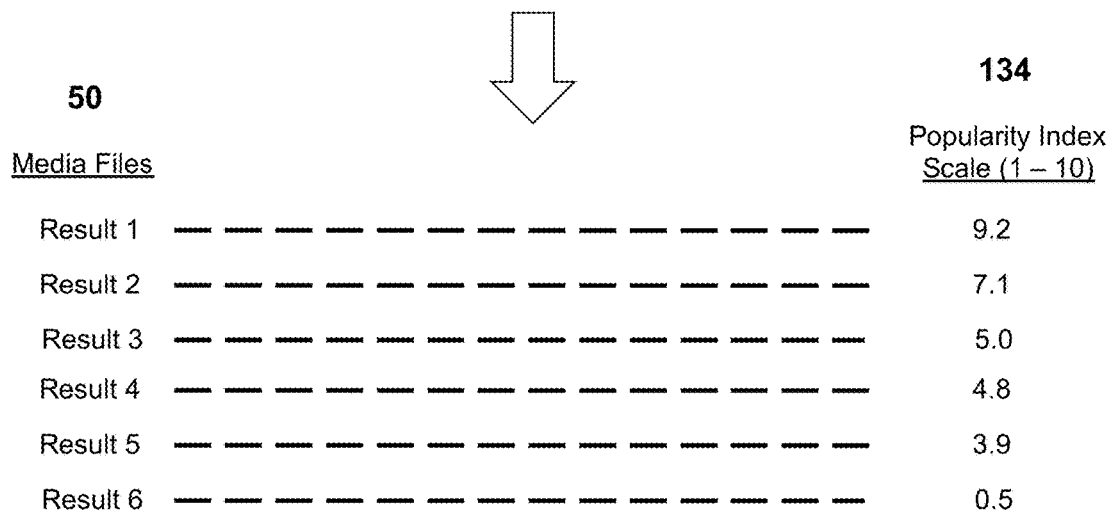
FIG. 20 is a diagram that illustrates a graphical user interface of the system described herein, which exemplifies the system's ability to retrieve and publish a popularity index value for each media file, as described herein.

Still further, the invention provides that the website 8 may further display the date of media file creation. This type of metadata is highly relevant to, and useful for, an operator of the system, insofar as a user may want to know approximately how old (or new) the information contained in a media file should be. In addition, referring to FIG. 20, the website 8 may further display metadata that comprise user activity statistics, which will be relevant to the popularity of a particular media file (i.e., a popularity index 134), such as the number of times that a particular media file has been played by users at large, the number of times that a media file has been shared with (or referred 28 to) others, and the total number of comments 26 associated with each media file. Such metadata, along with the date of file creation, may influence a search algorithm and its ranking of media files in a set of search results 50. For example, the invention contemplates that a search algorithm may rank the media files, in a set of search results 50, in a way that is biased towards media files that are relatively recent in creation, media files that are more popular (based on the metrics listed above), or some combination of such criteria.

Figure 21:
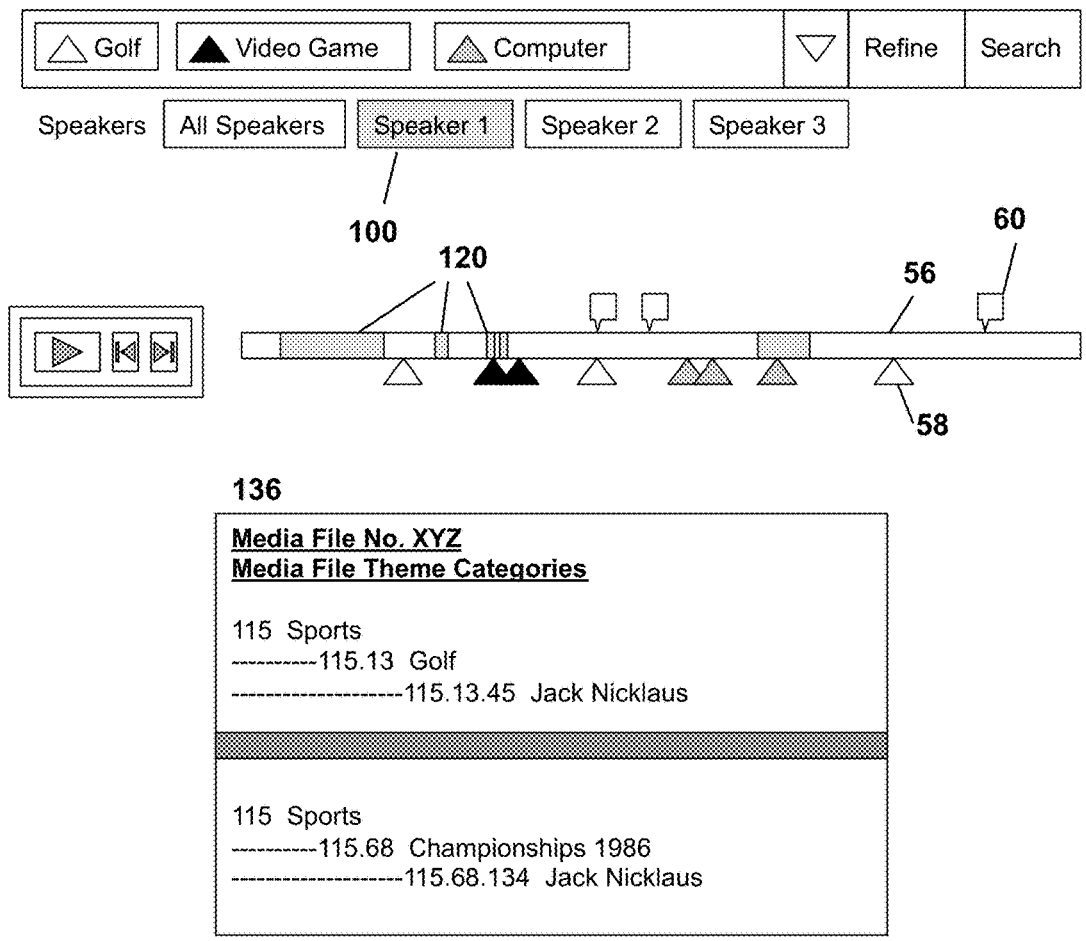
FIG. 21 is a diagram that illustrates a graphical user interface of the system described herein, which exemplifies the system's ability to retrieve and publish a theme category (or categories) that has been assigned to each media file.

Referring now to FIG. 21, according to yet additional embodiments, the invention provides that the server 2 may be configured to monitor and detect key words within the content of each media file and, based on presence and frequency of those key words, categorize each media file into one or more different topic or theme categories 136. More specifically, for example, the database 4 of the system may include a plurality of different themes (or topic categories) 136, with various terms assigned to each theme. The server 2 may be configured to detect the presence, and frequency, of these various terms within the content of media files that are uploaded to the system. Moreover, the invention provides that hypernym/hyponym relationships may also be catalogued and used to identify the appropriate theme category (or categories) 136 that should be assigned to each media file.

According to these embodiments, a user of the system could browse a catalogue of various themes, and select a desired media file (or multiple media files) for playback and review. This would enable users to quickly identify those media files that are most likely to contain information that the user is seeking. Still further, the invention provides that the media file search functionalities described above could be focused within a particular theme (or group of themes), e.g., a search of all media files, which have been catalogued under a "sports" theme, for all media files that include the key word "golf." In addition to top level theme identifiers, the invention provides that sub-themes, sub-sub-themes, and so on may be used to categorize and identify the content of media files. Furthermore, if a particular media file contains key words that span across multiple themes, the media file may be categorized under such multiple themes 136. The invention further provides that upon conducting a generalized search for all media files that contain a particular key word, as described above, the website 8 may publish a set of search results 50 as described above, as well as the theme category (or categories) that have been assigned to each media file within the set of search results 50.

Media File Ranking System

Referring now to FIG. 3, as mentioned above, the invention provides that a user may access his/her account 34, by providing the server 2 with an authorized username/password through the centralized website 8. The user may then perform a search 36 of the database 4 for desired media files, namely, media files containing one or more search terms (key words), as described herein. The invention provides that the server 2 will then generate a list of results 38, i.e., a list of media files that contain one or more of the queried search terms, within the centralized website 8. The user may then select one or more media files within the viewable search results for playback and/or other content review 42.

According to certain preferred embodiments, the invention provides certain improved systems and methods for ranking a select number of media files from within a larger body of media files. More particularly, the systems and methods employ the use of an algorithm, which is used to identify and rank a select number of media files (or excerpted portions thereof) from a larger body of media files. A non-limiting example of such algorithm is provided below:

$$r_i = a_u(x) + b_v(y) + c_x(z) + d_y(w)$$

According to such embodiments, "$r_i$" represents a weighted ranking value for media file "i," wherein the larger the "$r_i$" value that is assigned to a particular media file (or portion thereof), the higher it will appear in a set of search results (i.e., the higher the ranking).

In the algorithm set forth above, the variables (x), (y), (z) and (w) correspond to the criteria described below, and "$a_u$," "$b_v$," "$c_x$," and "$d_y$" represent constant weights to adjust the score for each measure. With respect to these variables, (x) represents a measurement of key word frequency, key word density, linkage of a media file to other media files, or combinations thereof; (y) represents a measurement of speaker vocal emotion, length of listener playback, speaker charisma parameters, or combinations thereof; (z) represents a measurement of a relative proportion of multiple search terms in a media file (i.e., a weighted term ranking), the presence of key words near the beginning and/or end of a media file (i.e., attention ranking), or combinations thereof; and (w) represents a measurement of the social activity that a particular media file has associated with it, such as a number of times that a media file has been shared with (referred to) others as described above, the number and/or length of comments (also described above) associated with a particular media file, a number of instances that a media file has been designated as a "favorite" by users of the system, the number of plays or views of a media file, or combinations of the foregoing.

More particularly, with respect to variable (x), the system may calculate the number of times that a searched key word is present in a particular media file or portion thereof (i.e., a key word frequency criterion). In addition, or as an alternative to a key word frequency criterion, variable (x) may represent a measure of keyword density, i.e., the number of times that a queried key word is detected within a defined portion of a media file (e.g., within a 10, 20, 30, 60, or 120 second segment of a media file). Still further, variable (x) may represent the number of times that a particular media file is linked to other media files, e.g., the number in-bound and/or out-bound hyperlinks that are associated with a particular media file and any other media file. According to yet further embodiments of the invention, variable (x) may represent a combination of the foregoing aspects of a particular media file.

With respect to variable (y), the system may represent a measurement of speaker charisma and/or vocal emotion. The measurement of speaker vocal emotion may take into account various acoustic parameters and profiles, which have been correlated with various emotions, such as anger, fear, joy, sadness, and neutral emotions. Those of ordinary skill in the art will recognize that certain emotions associated with high levels of physiological stimuli (e.g., anger, fear, anxiety, and joy) have been shown to be associated with increases in mean (average) $F_0$ values, more variable $F_0$ values, and vocal intensity. $F_0$ is known in the art as a metric that represents the fundamental frequency of speech, which corresponds to the rate of vocal-fold vibration and is perceived as vocal pitch. Acoustic differentiation among certain emotions have been found by examining $F_0$ contours (e.g., spectral patterns), or the pattern of $F_0$ changes over the course of a period of time. For example, $F_0$ has been found to decrease over time during experiences of anger, but to increase over time during portrayals of joy. In contrast, emotions associated with low levels of physiological arousal (e.g., sadness) have previously been correlated with lower mean $F_0$, $F_0$ variability, and vocal intensity, as well as decreases in $F_0$ over time.

Alternatively, or in addition to speaker vocal emotion, variable (y) may represent an average length of listener playback. This type of quantitative metric would be relevant insofar as it should correlate with an ability of a media file to capture and retain a listener's attention. For example, the server 2 may track and calculate a running mean for the duration of time that each user listens to a selected media file. This mean playback time may represent variable (y). Still further, as with the other variables, (y) may also represent a combination of the foregoing.

The invention provides that variable (z) may represent a measurement of a relative proportion of multiple key words in a media file (i.e., a weighted term ranking). For example, the invention provides that the system may allow a user to query a database of media files based on multiple key words. According to such embodiments, the variable (z) may represent a total sum of all key words found within each media file (or portions thereof). Alternatively, variable (z) may represent a total sum of all key words found within each media file (or portions thereof), multiplied by a weighting factor that is selected by the user. For example, in this embodiment, the user of the system may be allowed to specify that the presence of certain key words should be given more weight than others, during the ranking of corresponding media files in a set of search results. In addition, variable (z) may be an indicator for the presence of key words near the beginning and/or end of a media file (i.e., attention ranking). That is, the variable (z) may represent the total number of key words found within the first "β" number of seconds (or first β %) of a media file, and within the last "α" seconds (or last α %) of the media file. Still further, as with the other variables, variable (z) may represent a combination of the foregoing.

The invention further provides that variable (w) represents a measurement of the social activity that a particular media file has associated with it. For example, variable (w) may be correlated with the number of times that a media file has been shared with (referred to) others as described above. The system may track the total number of such referrals over a defined period of time, with such total representing variable (w). In addition, or alternatively, the system may track the total number of comments associated with a particular media file—or the total lines of commenting text, among all comments, associated with a media file (or, alternatively, a total word count among all comments associated with each media file). Still further, the invention provides that each media file may be linked to a social networking tag, whereby the system may allow users to select a linked tag associated with a particular media file to attribute some value to the media file, e.g., the system may track the total number of times that users select a "like" or "favorite" tag associated with each media file. In addition, or as an alternative, variable (w) may simply represent the number of times that a particular media file has been selected by a user for playback. And, similar to the other variables described above, (w) may represent a combination of the foregoing.

According to certain preferred embodiments, the invention provides that a user may specify the weights that should be applied to each of the variables (x), (y), (z) and (w), by adjusting the constant values that are assigned to "$a_u$," "$b_v$," "$c_x$," and "$d_y$." According to certain preferred embodiments, the invention provides that such constant values may be adjusted by a user of the system, through the centralized website 8 described herein. This way, if a user of the system would like the search results to reflect a bias towards any of the variables (x), (y), (z) and (w), and less bias towards others, the user may adjust the corresponding constant values "$a_u$," "$b_v$," "$c_x$," and "$d_y$."

The following Examples are provided for illustration purposes only, and should not limit the scope of the claimed invention in any way.

Example 1—Variables with Single Definition

In the following example, (x), (y), (z) and (w) are defined as set forth in Table 1 below, and "$a_u$," "$b_v$," "$c_x$," and "$d_y$" are prescribed the constant weights set forth in Table 2 below.

TABLE 1

| Variable | Definitions |
| --- | --- |
| (x) | A measurement of key word frequency. |
| (y) | An average length of listener playback. |
| (z) | The total number of key words found within the first 10 seconds of a media file and within the last 10 seconds of the media file. |
| (w) | The total number of comments associated with a particular media file. |

TABLE 2

| Constant | Value |
| --- | --- |
| $a_u$ | 0.4 |
| $b_v$ | 0.3 |
| $c_x$ | 0.1 |
| $d_y$ | 0.2 |

In this example, a user of the system conducted a search of the database as described herein, for media files that contain the key word "golf." The search identified five different media files that include such key word, having the variable attributes identified in Table 3 below.

TABLE 3

| Media File | Variable Values |
| --- | --- |
| 1 | (x) = 3 hits<br>(y) = 15 seconds<br>(z) = 1 hit<br>(w) = 5 comments |

TABLE 3-continued

| Media File | Variable Values |
|---|---|
| 2 | (x) = 5 hits |
|   | (y) = 20 seconds |
|   | (z) = 0 hit |
|   | (w) = 2 comments |
| 3 | (x) = 2 hits |
|   | (y) = 5 seconds |
|   | (z) = 0 hit |
|   | (w) = 1 comments |
| 4 | (x) = 3 hits |
|   | (y) = 12 seconds |
|   | (z) = 2 hit |
|   | (w) = 4 comments |

Based on the foregoing data, the system calculates the "$r_i$" values using the algorithm set forth above ($r_i = a_u(x) + b_v(y) + c_x(z) + d_y(w)$), as illustrated in Table 4 below.

TABLE 4

| Media File | $r_i$ Values |
|---|---|
| 1 | $r_i = (0.4)(3) + (0.3)(15) + (0.1)(1) + (0.2)(5)$ |
|   | $r_i = 6.8$ |
| 2 | $r_i = (0.4)(5) + (0.3)(20) + (0.1)(0) + (0.2)(2)$ |
|   | $r_i = 8.4$ |
| 3 | $r_i = (0.4)(2) + (0.3)(5) + (0.1)(0) + (0.2)(1)$ |
|   | $r_i = 2.5$ |
| 4 | $r_i = (0.4)(3) + (0.3)(12) + (0.1)(2) + (0.2)(4)$ |
|   | $r_i = 5.8$ |

Based on the foregoing "$r_i$" values, the search results would be ranked as illustrated in Tables 5 and 6 below.

TABLE 5

| Media File | Ranking |
|---|---|
| 1 | #2 |
| 2 | #1 |
| 3 | #4 |
| 4 | #3 |

TABLE 6

| Search Results |
|---|
| Media File 2 |
| Media File 1 |
| Media File 4 |
| Media File 3 |

Example 2—Variables With Multiple Definitions

In the following example, variables (x), (y), (z) and (w) are defined as set forth in Table 7 below, and "$a_u$," "$b_v$," "$c_x$," and "$d_y$" are prescribed the constant weights set forth in Table 8 below.

TABLE 7

| Variable | Definitions |
|---|---|
| $(x)_1$ | A measurement of the key word frequency for "golf." |
| $(x)_2$ | The number of times that the media file is linked to other media files. |
| $(y)_1$ | An average length of listener playback. |
| $(y)_2$ | Average $F_0$ value of a media file. |

TABLE 7-continued

| Variable | Definitions |
|---|---|
| $(z)_1$ | The total number of key words found within the first 10 seconds of a media file and within the last 10 seconds of the media file. |
| $(z)_2$ | A total sum of the key word frequency for "golf" and "baseball." |
| $(w)_1$ | The total number of comments associated with a particular media file. |
| $(w)_2$ | The total word count among all comments associated with a media file. |

TABLE 8

| Constant | Value |
|---|---|
| $a_u$ | 0.3 |
| $b_v$ | 0.3 |
| $c_x$ | 0.2 |
| $d_y$ | 0.2 |

In this example, a user of the system conducted a search of the database as described herein, for media files that contain the key words "golf" and "baseball." The search identifies five different media files that include such key words, having the variable attributes identified in Table 9 below.

TABLE 9

| Media File | Variable Values |
|---|---|
| 1 | $(x)_1$ = 3 hits |
|   | $(y)_1$ = 15 seconds |
|   | $(z)_1$ = 1 hit |
|   | $(w)_1$ = 5 comments |
|   | $(x)_2$ = 12 links |
|   | $(y)_2$ = 2 ($F_0$ value) |
|   | $(z)_2$ = 5 hits |
|   | $(w)_2$ = 24 words |
| 2 | $(x)_1$ = 5 hits |
|   | $(y)_1$ = 20 seconds |
|   | $(z)_1$ = 0 hit |
|   | $(w)_1$ = 2 comments |
|   | $(x)_2$ = 2 links |
|   | $(y)_2$ = 3 ($F_0$ value) |
|   | $(z)_2$ = 6 hits |
|   | $(w)_2$ = 9 words |
| 3 | $(x)_1$ = 2 hits |
|   | $(y)_1$ = 5 seconds |
|   | $(z)_1$ = 0 hit |
|   | $(w)_1$ = 1 comments |
|   | $(x)_2$ = 5 links |
|   | $(y)_2$ = 4 ($F_0$ value) |
|   | $(z)_2$ = 3 hits |
|   | $(w)_2$ = 40 words |
| 4 | $(x)_1$ = 3 hits |
|   | $(y)_1$ = 12 seconds |
|   | $(z)_1$ = 2 hit |
|   | $(w)_1$ = 4 comments |
|   | $(x)_2$ = 2 links |
|   | $(y)_2$ = 2 ($F_0$ value) |
|   | $(z)_2$ = 5 hits |
|   | $(w)_2$ = 10 words |

Based on the foregoing data, as with the previous Example, the system calculates the "$r_i$" values (Table 10) using the same algorithm as described above, provided that a mean value is calculated for each variable as illustrated in the modified algorithm below:

$$r_i = ((a_u(x_1) + a_u(x_2))/2) + ((b_v(y_1) + b_v(y_2))/2) + ((c_x(z_1) + c_x(z_2))/2) + ((d_y(w_1) + d_y(w_2))/2).$$

TABLE 10

| Media File | $r_i$ Values |
|---|---|
| 1 | $((0.3)(3) + (0.3)(12))/2 +$ <br> $((0.3)(15) + (0.3)(2))/2 +$ <br> $((0.2)(1) + (0.2)(5))/2 +$ <br> $((0.2)(5) + (0.2)(24))/2.$ <br> $r_i = 8.3$ |
| 2 | $((0.3)(5) + (0.3)(2))/2 +$ <br> $((0.3)(20) + (0.3)(3))/2 +$ <br> $((0.2)(0) + (0.2)(6))/2 +$ <br> $((0.2)(2) + (0.2)(9))/2.$ <br> $r_i = 6.2$ |
| 3 | $((0.3)(2) + (0.3)(5))/2 +$ <br> $((0.3)(5) + (0.3)(4))/2 +$ <br> $((0.2)(0) + (0.2)(3))/2 +$ <br> $((0.2)(1) + (0.2)(40))/2.$ <br> $r_i = 6.8$ |
| 4 | $((0.3)(3) + (0.3)(2))/2 +$ <br> $((0.3)(12) + (0.3)(2))/2 +$ <br> $((0.2)(2) + (0.2)(5))/2 +$ <br> $((0.2)(4) + (0.2)(10))/2.$ <br> $r_i = 5.0$ |

Based on the foregoing "$r_i$" values, the search results would be ranked as illustrated in Tables 11 and 12 below.

TABLE 11

| Media File | Ranking |
|---|---|
| 1 | #1 |
| 2 | #3 |
| 3 | #2 |
| 4 | #4 |

TABLE 12

| Search Results |
|---|
| Media File 1 |
| Media File 3 |
| Media File 2 |
| Media File 4 |

Text File Indexing and Storage System

According to certain embodiments, the present invention may further encompass systems and methods for searching a plurality of text files and, particularly, to systems and methods that facilitate the identification of relevant key words for conducting such searches (with such text files potentially having been created independently from a media file, as described above). In these embodiments, the system generally comprises the same components referenced above—a server 2 that is configured to receive, index, and store a plurality of text files, which are received by the server 2 from a plurality of sources, within at least one database 4 in communication with the server 2.

As described above, the invention provides that the text files may be indexed 6 and categorized within the database 4 based on author, time of recordation, geographical location of origin, IP addresses, language, key word usage, combinations of the foregoing, and other factors. Similar to the other embodiments described herein, the invention provides that the text files are preferably submitted to the server 2 through a centralized website 8 that may be accessed through a standard internet connection 10. The invention provides that the website 8 may be accessed, and the text files submitted to the server 2, using any device that is capable of establishing an internet connection 10, such as using a personal computer 12 (including tablet computers 16), telephones 14 (including smart phones, PDAs, and other similar devices), and other devices. The invention provides that the text files may be created by such devices and then uploaded to the server 2.

Figure 22:
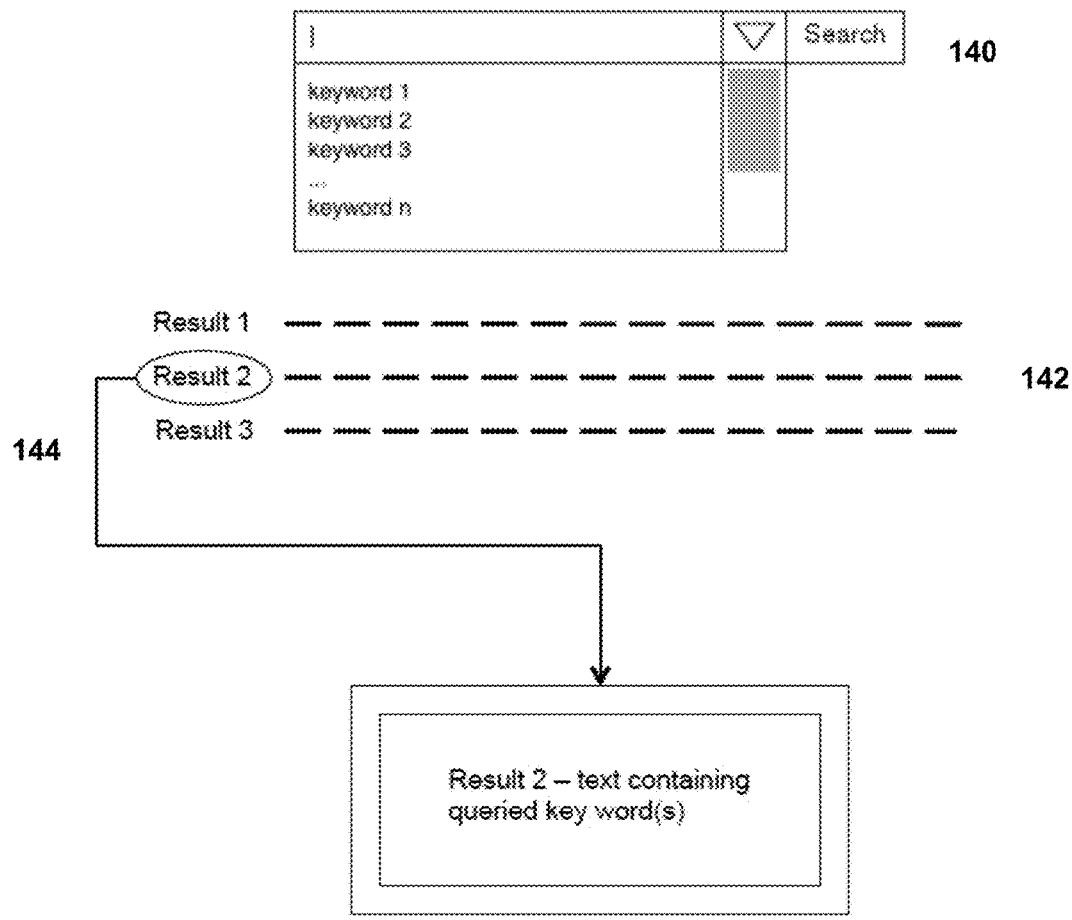
FIG. 22 is a diagram showing certain non-limiting components of an exemplary graphical user interface in which a user may query the content of a plurality of text files, identify those text files which include a certain key word (or set of key words) that the user defines (and which may be proposed by the server as described herein), and quickly view the context in which such key word is used in one or more text files.

Referring now to FIG. 22, the invention provides that a user of the system may perform a search 140 of the database 4 for desired text files, namely, text files containing one or more search terms (key words), as described herein. The invention provides that the system, and search function 140, may employ Boolean search logic, e.g., by allowing conjunctive and disjunctive searches, truncated and non-truncated forms of key words, exact match searches, and other forms of Boolean search logic.

According to certain preferred embodiments of the invention, the search functionality 140 may employ an auto-complete feature. For example, the search functionality 140 may utilize an auto-complete drop-down menu, which lists various proposed key words that may be used to perform the search. The invention provides that these proposed key words will preferably represent the most relevant key words, as determined by the server 2 of the system. The server 2 of the system will maintain a running log of the most relevant key words, which will be identified and extracted from text that has been indexed within the system as described above. In certain embodiments, the server 2 may also maintain a list of automatically extracted key words for each text file that is submitted to the system, which can be augmented by an administrator/manager of a particular text file, with the running list of relevant key words being computed by aggregating such key word lists.

In certain embodiments, the search functionality 140 may also be configured to automatically present a list of proposed key words when a user clicks a search bar (or places a cursor in a search text field). When and if a user selects any of the proposed key words that are presented in the auto-complete feature described above, the system will automatically conduct a search of the plurality of text files stored within the system (server 2/database 4) using the selected key words.

The system will preferably employ an algorithm (or other means) for proposing in the auto-complete feature: (i) the most frequently searched key words, (ii) the key words that are most frequently present in a single text file (or a group of text files), and (iii) the most information-rich key words. In other words, as described above relative to other embodiments, the system will preferably factor all of those criteria when calculating its proposed list of key words, which will thereby create a list of proposed key words that are most relevant to a user of the system. The system will maintain a record of the key words that are most frequently search by users of the system—and a record of how frequently certain key words are present in a single media file (or group of media files).

The system will continually analyze the text that is provided to the system, as the files are being indexed therein. In addition, the system will be configured to analyze the text from all text files that are present in a set of search results generated by users over a period of time. This way, the above-referenced algorithm will be capable of assigning a score to various words (potential key words) included within such bodies of text. This scoring technique may also be applied to adjacent word pairs, or longer sequences of words (e.g., phrases and the like). The criteria that are factored into such scores may include, but are not limited to, the frequency of such key words in a body of text, the length of text in which the key words are present, the nature or type of speech in which such key words are found (in the case of text that has been transcribed from a media file), whether a particular word is a "stop word," and others.

The system will maintain a running aggregation of scores for a body of key words (or, as mentioned above, groups of key words), with such aggregation being calculated across multiple bodies of texts derived from the text files provided to the system. The system may prioritize and rank key words by calculating a mean score value for each key word (or groups of key words) across the plurality of text files analyzed. The system may then rank such key words based on the calculated mean score values. The invention provides that the system may prioritize and rank key words by other means as well, provided that the goal of such ranking system is to present to a user of the system a set of proposed key words that are possibly the most relevant to the user, based on the most frequently searched and information-rich key words identified by the system. The auto-complete function described herein allows searchers to modify their search terms based upon the menu of choices presented by the system.

Following the search 140, the invention provides that the server 2 will then generate a list of results 142 (within the centralized website 8), i.e., text files that contain one or more of the queried search terms. The user may then select one or more text files within the viewable search results for review 144. The server 2 may present the search results 142 to the user within the website 8 and, preferably, list all responsive text files in a defined order within such graphical user interface. For example, the search results may list the text files in chronological order based on the date (and time) that each text file was recorded and provided to the database 4. In other embodiments, the text files may be listed in an order that is based on the number of occasions that a key word is used within each text file. Still further, the text files may be listed based on the number of occurrences of key words in metadata associated with the text files, such as titles, description, comments, etc. In addition, the text files may be listed by measuring user activity, such as the number of views of such text files. These criteria, combinations thereof, or other criteria may be employed to list the responsive text files in a manner that will be most relevant to the user. Still further, the invention provides that a user may specify the criteria that should be used to rank (and sort) the search results, with such criteria preferably being selected from a predefined list.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for receiving, analyzing, and organizing audio content contained within a plurality of media files, which comprises a server that is configured to:
   (a) receive, index, and store the plurality of media files, which are received by the server from a plurality of sources, within at least one database in communication with the server;
   (b) perform a text transcription of audio content included within the media files and store said transcription in the database; and
   (c) extract metadata associated with each of the media files and store said metadata within the database, wherein said metadata comprises: (i) links to one or more profile pages that are published within one or more social networks, wherein each of such profile pages are correlated with a unique voice signature that is detected within each media file; (ii) a geographical area from which each media file is provided to the server; (iii) a date on which each media file was created; (iv) a popularity index that is assigned to each media file; and (v) one or more theme categories that are assigned to each media file.

2. The system of claim 1, wherein the popularity index that is assigned to each media file is based on: (a) a number of times that each media file has been played by users of the system; (b) a number of times that each media file has been shared with or referred to others through the website; (c) a total number of comments associated with each media file, which are viewable within the website; or (d) combinations of (a)-(c).

3. The system of claim 2, wherein the database further comprises a table of theme categories, with each theme category being correlated with one or more terms.

4. The system of claim 3, wherein the server assigns one or more theme categories to each media file based on the presence and frequency of said one or more terms within the text transcription of the audio content of each media file.

5. The system of claim 4, wherein the server is further configured to organize audio content included within each of the plurality of media files in at least one vertex of a bipartite graph, wherein each said vertex may be correlated with a specific media file or an individual who is associated with a specific media file, wherein each vertex comprises edges, each of which are labeled with a word that is detected within the audio content of a media file.

* * * * *